United States Patent [19]

Said et al.

[11] 3,862,927

[45] Jan. 28, 1975

[54] PROCESS FOR PREPARATION OF VASOACTIVE INTESTINAL PEPTIDE

[76] Inventors: Sami I. Said, Dept. of Internal Medicine, The Univ. of Texas Southwestern Medical School, 5323 Harry Hines Blvd., Dallas, Tex. 75235; Miklos Bodanszky, Dept. of Chemistry, Case Western Reserve University, Cleveland, Ohio 44106; Viktor Mutt, Jungfrudansen 18", 171 55 Solna, Sweden; Yakir Klausner, Dept. of Biological Chemistry, The Hebrew University, Jerusalem, Israel

[22] Filed: Sept. 28, 1973

[21] Appl. No.: 401,624

Related U.S. Application Data

[63] Continuation-in-part of Ser. No. 335,976, Feb. 26, 1973, abandoned.

[52] U.S. Cl. ............................. 260/112.5, 424/177
[51] Int. Cl. . C07c 103/52, A61k 27/00, C07o 7/00
[58] Field of Search ................................ 260/112.5

[56] References Cited
OTHER PUBLICATIONS

Said et al., Science 169, 1217–1218 (1970).

*Primary Examiner*—Lewis Gotts
*Assistant Examiner*—Reginald J. Suyat
*Attorney, Agent, or Firm*—Lowe, King & Price

[57] ABSTRACT

Vasoactive intestinal peptide (V.I.P.) is prepared by controlled, stepwise procedure starting with individual amino acid components. This peptide has the property of inducing systemic vasodilation, lowering arterial blood pressure, and relaxing certain smooth muscle.

32 Claims, No Drawings

PROCESS FOR PREPARATION OF VASOACTIVE INTESTINAL PEPTIDE

This application is a continuation-in-part of our application Ser. No. 335,976, filed Feb. 26, 1973, now abandoned and is related to U.S. application Ser. No. 181,444, filed Sep. 17, 1971.

The invention described herein was made in the course of work conducted under a grant or award from the United States Department of Health, Education and Welfare.

This invention is concerned generally with novel processes for the controlled synthesis of a vasoactive intestinal peptide (V.I.P.), an octacosapeptide having the structure set forth hereinbelow, in which synthesis, individual amino acid components of the peptide chain are connected in the stated sequence by peptide linkages; and to intermediates in said novel processes. More particularly, V.I.P. is prepared either by successively introducing each of the individual amino acid components stepwise in sequence, or by synthesizing two or more segments of the peptide chain followed by coupling of such segments in the stated sequence.

V.I.P. is a peptide of 28 amino residues having systemic vasodilator activity. It induces systemic hypotension and increases cardiac output on i.v. infusion. It increases hepatic arterial blood flow, increases blood sugar levels, and relaxes smooth muscle. It is, therefore, of potential value in treatment of hypertension and peripheral vascular disease on parenteral administration, and as a bronchodilator on aerosol or parenteral administration.

The vasoactive intestinal peptide of this invention (V.I.P.) is an octacosapeptide having the following structure:

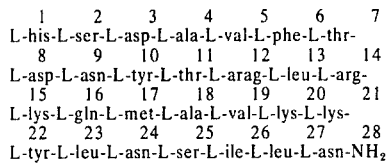

```
 1     2     3     4     5     6     7
L-his-L-ser-L-asp-L-ala-L-val-L-phe-L-thr-
 8     9    10    11    12    13    14
L-asp-L-asn-L-tyr-L-thr-L-arag-L-leu-L-arg-
15    16    17    18    19    20    21
L-lys-L-gln-L-met-L-ala-L-val-L-lys-L-lys-
22    23    24    25    26    27    28
L-tyr-L-leu-L-asn-L-ser-L-ile-L-leu-L-asn-NH₂
```

In this specification, the amino acid components or groups of amino acid components, will be referred to by the number system indicated in the above structure.

This peptide has been obtained from hog small intestine, and is active in inducing vasodilation, lowering arterial blood pressure, increasing cardiac output, and relaxing tracheal, gastric and gall-bladder smooth muscle. [Said and Mutt, Science 169 1217 (1970); Said and Mutt, Eur. J. Biochem. 28 199 (1972); Piper et al., Nature 225 1144 (1970).]

In the above structure the amino acid components of the peptide are identified by abbreviations for convenience. These abbreviations are as follows:

| Amino Acid | Abbreviated Designation |
|---|---|
| L-methionine | met |
| L-arginine | arg |
| L-analine | ala |
| L-aspartic acid | asp |
| L-histidine | his |
| L-lysine | lys |
| L-leucine | leu |
| L-phenylalanine | phe |
| L-isoleucine | ile |
| L-asparagine | asn |
| L-serine | ser |
| L-tyrosine | tyr |
| L-threonine | thr |
| L-valine | val |
| L-glutamine | gln |

In accordance with the present invention, V.I.P. is prepared by a combination of sequential stepwise coupling (by peptide linkages) of individual amino acid components, and of block synthesis wherein various peptide segments or fragments are individually synthesized, and these segments are then coupled in proper sequence to form the desired intermediates and final V.I.P. product.

In carrying out these sequential or block syntheses, involving reaction between carboxy (or activated carboxyl) of one amino acid and amino grouping of the other, it is ordinarily preferred to protect the amino groupings in the amino acid or peptide undergoing reaction at the carboxyl end of the molecule, as well as other functional groupings in both reactants which are reactive under the conditions of such syntheses. Protecting groups must retain their protecting properties under the peptide coupling conditions, and must be selectively removable without affecting peptide linkages. Protecting groups to be removed following a particular step must be selectively removable without affecting other protecting groups to be retained in later coupling steps.

According to this invention, the combination of sequential and block syntheses is used to obtain V.I.P., and the smaller peptides employed as intermediates. More specifically, protected peptides with the amino acid sequences 18–28; 14–17; 7–13; and 1–6 are prepared via the sequential stepwise route, and these peptide fragments coupled in the desired sequence as by the azide reaction. In this manner, the fragments having the V.I.P. sequences 14–17 and 18–28 are coupled to obtain the fragment with the 14–28 amino acid sequence, and this material reacted with the peptide having the V.I.P. 7–13 amino acid sequence to afford the 7–28 fragment. Finally, this latter fragment is coupled with the V.I.P. 1–6 amino acid sequence fragment and the protected groups removed from the resulting octacosapeptide to give V.I.P.

Certain of the novel peptides useful as intermediates in this synthesis of V.I.P. are additionally useful in that, after removal of any protecting groups, they have V.I.P.-like activity in their own right. Thus, the peptides having the 1–6; 18–28; 15–28; 14–28 and 7–28 amino acid sequences of V.I.P. produce vasodilation, systemic hypotension and relaxation of tracheal smooth muscle. Certain of these, and particularly the V.I.P. 7–28 fragment also are useful in relaxing stomach smooth muscle. They are, therefore, useful in the same manner as V.I.P. although for optimal effect should be employed in doses from 10–500 times larger than for V.I.P. itself. These intermediates are also novel products.

As pointed out above, in conducting the process it is necessary to protect or block the amine and carboxyl groups in order to control the reaction and obtain the products desired. Suitable amino-protecting groups which may be usefully employed include salt formation for protecting strongly-basic amino groups, or urethane protecting substituents such as benzyloxycarbonyl (carbobenzoxy) and t-butyloxycarbonyl It is preferred to utilize tert-butyloxycarbonyl (tBOC) for protecting the α-amino group in the amino acids (or peptides) undergoing reaction at the carboxyl end of the molecule, since the tBOC protecting group is readily removed following such reaction and prior to the subsequent step (wherein such α-amino group itself undergoes reaction) by relatively mild action of acids (e.g. trifluoroacetic acid), which treatment does not otherwise affect groupings used to protect other amino groups. It will thus be understood that the amino groups may be protected by reaction with any material which will protect the amino grouping for the subsequent reaction(s) but which may later be removed under conditions which will not otherwise affect the molecule. Illustrative of such materials are organic carboxylic acid derivatives which will acylate the amino group. In this specification, all protecting groups may be referred to generally by the symbols X and $X_1$ and Y represents an activating group.

In general, the amino groups can be protected by reaction with a compound containing a grouping of the formula:

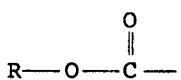

wherein R is any grouping which will prevent the amino group from entering into subsequent coupling reactions and which can be removed without destruction of the molecule. Thus R is a straight or branched chain alkyl which may be unsaturated, preferably of 1 to 10 carbon atoms, aryl, preferably of 6 to 15 carbons; cycloalkyl, preferably of 5 to 8 carbon atoms; aralkyl, preferably of 7 to 18 carbon atoms, alkaryl, preferably of 7 to 18 carbon atoms, or hetercyclic, e.g. isonicotinyl. The aryl, aralkyl and alkaryl moieties may also be further substituted as by one or more alkyl groups of 1 to about 4 carbon atoms. Preferred groupings for R include tertiary-butyl, tertiary-amyl, phenyl, tolyl, xylyl and benzyl. Highly preferred specific amino-protecting groups include benzyloxycarbonyl; substituted benzyloxycarbonyl wherein the phenyl ring is substituted by one or more halogens, e.g. Cl or Br,; nitro; lower alkoxy, e.g. methoxy; lower alkyl; tertiary-butyloxycarbonyl, tertiary-amyloxycarbonyl; cyclohexyloxycarbonyl; vinyloxycarbonyl; adamantyloxycarbonyl; biphenylisopropoxycarbonyl; and the like. Other protecting groups which can be used include isonicotinyloxycarbonyl, phthaloyl, para-tolylsulfonyl, formyl and the like.

In conducting the process of the invention the peptide fragments are built by reaction of the amino groups with a compound which will add one of the blocking or protecting groups mentioned above to the molecule, the fragment being reacted with a compound to introduce the protective grouping on the amino group. This reaction may be conducted by methods known to the art, as by reaction with the corresponding anhydrides, azides, acid chlorides, O-acyl hydroxylamine derivatives, and active esters such as alkyl esters with electron attracting (negative) substituents, vinyl esters, enol esters, phenyl esters, thiophenyl esters, nitrophenyl esters, 2,4-dinitrophenyl esters, and nitrophenylthiol esters. For reaction or coupling, the carboxyl component is activated at its carboxyl group so that the carboxyl group can then react with the free amine on the peptide chain. To achieve activation the carboxyl group can be converted to any of the groups mentioned. It should be understood that during these reactions, the amino acid moieties contain both amino groups and carboxyl groups and usually one grouping enters into the reaction while the other is protected. Thus, when undergoing reaction, the carboxyl component has to be protected on its amino group. On the other hand, the amino component must be protected on its carboxyl component. Prior to the coupling step, the protecting group on the alpha- or terminal-amino group is removed under conditions which will not substantially affect the protecting group on the epsilon-amino group of the lysine molecule. The preferred procedure for effecting this step is mild acidolysis, as by reaction at room temperature with a mixture of trifluoroacetic acid and acetic acid.

Groups which may be used to protect the carboxyl moiety include amides, salt formation, ester substituents such as the lower alkyl esters, e.g., the methyl and ethyl esters (which are preferred where subsequent conversion, via the hydrazide, to the azide is desired), the benzyl ester, p-nitrobenzyl ester, and the like. Selection of protecting groups is in part dictated by particular coupling conditions, and in part by the amino acid and peptide components involved in the reaction.

The emino protecting groups may be removed by known reactions such as reduction with sodium in liquid ammonia, hydrogenolysis such as in the presence of palladium on charcoal catalyst, in acetic acid, by treatment with trifluoacetic acid, or a hypohalo acid such as HCl and HBr.

It will be understood, of course, that other amino acids of this molecule contain groups which can be protected if desired or necessary. This invention is to be considered as inclusive of the synthesis whether or not these additional groups are protected, although in the specific embodiment most of them were not protected. Exemplary of groupings of this type are the hydroxyl substituents in serine, threonine, and tyrosine which can be protected by groups such as benzyl, tertiarybutyl, tetrahydropyranyl and the like. Similarly, the imidazolyl group in histidine, the carboxyl group on aspartic acid, the carboxylic acid amide groups in asparagine and glutamine, the quanidino moiety in arginine and the methyl-thio group on methionine can be protected by means known to the art. While it is not always necessary to protect these groupings, it is to be understood that in simple variations in the synthesis of this invention these groups may be protected and the invention is considered to be inclusive of all such variations.

In this application, the various derivatives, protecting groups, reagents, solvents, etc. are referred to by abbreviation for convenience as follows:

| Derivatives; Protecting Groups; Reagents; Solvents | Abbreviated Designation |
|---|---|
| Nitro | $NO_2$ |
| Benzyl | BZL |
| Tertiary-butyloxycarbonyl | tBOC |
| Tertiary-amyloxycarbonyl | AOC |
| N-hydroxysuccinimide ester | OSu |
| Methyl ester | OMe |
| Trifluoroacetic acid | TFA |
| Dicyclohexylcarbodiimide | DCC |
| Ethyl ester | OEt |
| Benzyloxycarbonyl | Z |
| Dimethylformamide | DMF |
| Tetrahydrofuran | THF |

-Continued

| Derivatives; Protecting Groups; Reagents; Solvents | Abbreviated Designation |
|---|---|
| p-Nitrophenyl ester | ONP |
| B(D—Dinitrophenyl ester | ODNP |
| 1-ethoxy-2-ethyl-1,2-dihydroquinoline | EEDQ |

As indicated in the chart, the process of this invention may be described as a method for the preparation of Vasoactive Intestinal Peptide which comprises coupling by peptide linkages

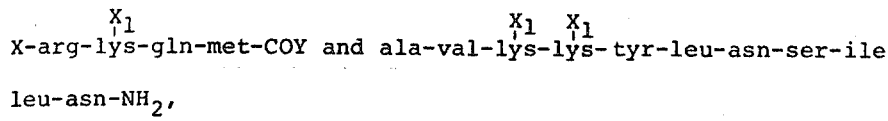

X-arg-lys-gln-met-COY and ala-val-lys-lys-tyr-leu-asn-ser-ile-leu-asn-$NH_2$,

While these are the preferred reagents and groups it is obvious that equivalent materials may also be used.

As pointed out above, the synthesis of V.I.P. involves a multi-step procedure in which protected peptides are formed and then joined. The most preferred embodiment of this sequence is illustrated in the following chart. In this chart there is set forth the procedure by which the 18–28 sequence is coupled to the 14–17 sequence to provide the 14–28 peptide. This peptide is then coupled to the 7–13 sequence to provide the 7–28 peptide, which in turn is coupled to the 1–6 sequence to provide the 1–28 V.I.P. In the compounds and reactions of this chart, X represents temporary amino protecting groups on the terminal amino group, that is the alpha-amino group which undergoes reaction in formation of the molecule; $X_1$ represents a more permanent amino protecting group on the lysyl residues and Y represents an activating group on the carboxyl. In the preferred embodiment of this invention X is t-butyloxycarbonyl, $X_1$ is benzyloxycarbonyl and Y is an azide activating group. In this sequence of reactions, it should be understood that all X's, $X_1$'s, or Y's need not be the same as different protecting and activating groups can be used.

removing the X amino-protecting group from the resulting peptide, reacting the latter product with X-thr-aspasn-tyr-thr-arg-leu-COY; removing the X amino-protecting group from the resulting peptide and reacting the thus formed peptide with X-his-ser-asp-ala-val-phe-COY to produce

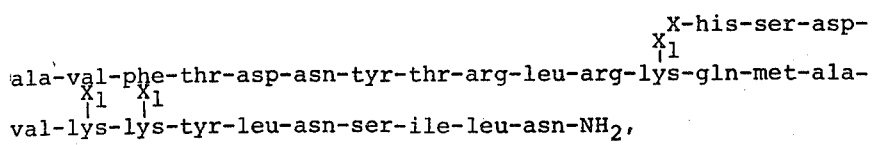

X-his-ser-asp-ala-val-phe-thr-asp-asn-tyr-thr-arg-leu-arg-lys-gln-met-ala-val-lys-lys-tyr-leu-asn-ser-ile-leu-asn-$NH_2$, and removing the X and $X_1$ protecting groups from the latter compound, wherein in the above reactions X and $X_1$ are amino-protecting groups and Y is a carboxyl activating group.

From the above chart it will be seen that the initial step of the process requires use of the 18–28 amino acid sequence as a basic starting material which is then reacted with the amino acid 14–17 sequence and in turn the 7–13 sequence and 1–6 sequence. According to this invention these required starting materials are produced via the preparation of fragments of the chain and then coupling of the fragments. The fragments can be prepared by building one amino acid upon the other, i.e., stepwise chain lengthening, to ultimately result in the desired sequence or by forming small fragments and effecting coupling therebetween to provide the desired peptide sequence. By these procedures the entire V.I.P. product can be synthesized.

OUTLINE OF THE SYNTHESIS OF VIP

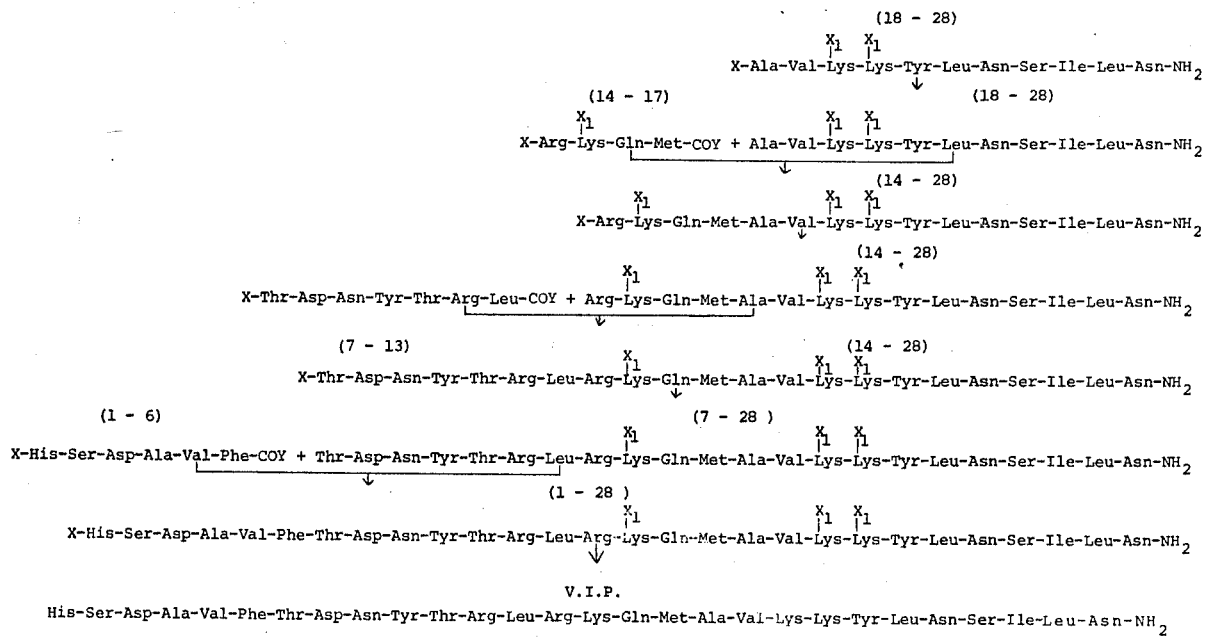

Coupling of the various fragments of this invention can be carried out as desired or by any of the methods known to the art. The preferred procedure for effecting coupling is to activate the carboxyl group of one fragment as by formation of an alkyl ester, convert to the azide via the hydrazide, and react the azide with the fragment containing the free amino group. Various other methods may also be utilized for coupling the fragments, many of which are well known in the art. Thus, the amide bond may be formed by treatment of a solution of the carboxylic fragment with the amino fragment with dicyclohexylcarbodiimide. It is within the scope of this invention, however, to react any derivative of the carboxyl and amino components of each fragment or the groups per se. Thus, for reaction with the amino group of the other fragment, the carboxyl substituent may be activated by conversion to an azide, a mixed or unsymmetrical anhydride, a symmetrical anhydride, a halide (to form the acyl chloride, bromide, etc.), an active ester such as an aryl ester, an acyl derivative of hydroxylamine, any reactive N-acyl derivative, such as acyl imidazole, and the like. Thus, any coupling procedure may be employed as desired although those described herein are preferred.

In the most preferred embodiment of this invention, the 18–28 hendecapeptide or sequence is initially prepared by stepwise building of the molecule. Thus, beginning with a protected asparaginamide, the 18–28 sequence is prepared by reaction thereof with a protected leucine ester, such as the para-nitrophenyl ester, after the protecting group is removed as by reaction with HBr or hydrogenation. The coupling reaction is one of acylation between the amine and ester in DMF or equivalent medium. The preferred protecting groups are benzyloxycarbonyl groups although equivalent protecting groups may be used. The resulting product, protected leu-asn-$NH_2$, is then subjected to further sequential reactions with the required amino acid for stepwise lengthening of the chain to eventually form the protected 18–28 sequence. When the amino acid contains an active functional group which is not to enter into the reaction, it can also be protected. Thus, the hydroxyl group of serine and tyrosine may be protected by formation of an aryloxy group, i.e. benzyloxy, in that position, which can be subsequently removed without destruction of the molecule. In addition, for the lysine molecule, it may be necessary to protect both amino substituents. However, the protection of these substituents must be carried out with different protecting groups as the protecting group on the alpha- or terminal -amino group must be removed for reaction in the next step without affecting the protecting group on the epsilon-amino group. In this process, it is highly preferred to protect the alpha-amino group on the lysine molecule with t-butyloxy-carbonyl and the epsilon-amino group with benzyloxycarbonyl since the former group can be removed by acidolysis without removal of the latter. A preferred acidolysis reaction is treatment with a mixture of 70 percent trifluoroacetic acid and 30 percent acetic acid at room temperature for about 25 minutes.

The 14–17 tetrapeptide or sequence can be prepared by generally the same series of reactions beginning with a protected glutamine ester such as tBOC-gln-ONP. In this series of reactions to produce the protected 14–17 sequence, the arginine side chain is preferably protected by protonation of the guanidino group.

The 18–28 hendecapeptide is then coupled to the 14–17 tetrapeptide preferably by forming the azide of the tetrapeptide and reacting with the partially deprotected 18–28 hendecapeptide, that is the 18–28 sequence from which the protecting group on the terminal amino group has been removed as by acidolysis. The 14–17 tetrapeptide azide is prepared by converting the ester to the hydrazide by reaction with hydrazine and then converting to the azide by reaction with an alkyl nitrite at temperatures of below 0°C. The coupling reaction between the tetrapeptide azide and partially deprotected hendecapeptide may be carried out by known methods. Obviously any of the other methods disclosed herein for effecting coupling of these sequences may be used other than the azide reaction.

The 7–13 sequence or heptapeptide, was prepared by stepwise chain lengthening starting with the known protected dipeptide, benzyloxycarbonyl-nitro-L-arginyl-L-leucine methyl ester or corresponding derivatives. After removal of the terminal amino protective group as by acidolysis, e.g. with HBr in acetic acid, the resulting amine was acylated with protected L-threonine with the aid of 1-ethoxy-2-ethyl-1,2-dihydroquinoline (EEDQ). After deblocking the resulting tripeptide derivatives with trifluoroacetic acid, the chain was lengthened by the incorporation of amino-protected-OH-protected-L-tyrosine in the form of its ester. The next two residues, L-asparagine and α-benzyl-L-aspartic acid, were introduced in the same manner. The fully protected heptapeptide was obtained by the application of a protected L-threonine such as t-butyloxycarbonyl-L-threonine-2,4-dinitrophenyl ester or equivalent reactant. The benzyl groups from the side chains of the aspartyl and tyrosine residues and the nitro group from the guanidino function of the arginine moiety were simultaneously removed by catalytic hydrogenation and the partially protected heptapeptide methyl ester was converted to the corresponding hydrazide.

After the 7–13 heptapeptide hydrazide was prepared, it was then converted to the azide or equivalent reactant and coupled to the 14–28 sequence to form the 7–28 sequence in the manner described above.

The 1–6 hexapeptide was prepared by stepwise chain lengthening starting with protected L-valine which was coupled to L-phenylalanine alkyl ester by the dicyclohexylcarbodiimide (DCC) method to give the protected dipeptide, protected L-valyl-L-phenylalanine alkyl ester. Hydrogenation of this compound followed by acylation (DCC) with protected L-alanine afforded the protected tripeptide, protected L-alanyl-L-valyl-L-phenylalanine alkyl ester. After treatment with hydrogen bromide in acetic acid, the chain was lengthened by incorporation of aspartic acid in the form of t-butyloxycarbonyl-β-benzyl-L-aspartic acid p-nitrophenyl ester. The resulting protected tetrapeptide was treated with trifluoroacetic acid and then acylated with t-amyloxycarbonyl-O-benzyl-L-serine p-nitrophenyl ester. After partial deprotection as with trifluoroacetic acid, the histidine residue was introduced by the Honzl-Rudinger modification of the azide method. In this synthesis the preferred protecting groups are benzyloxycarbonyl or tertiarybutyloxycarbonyl. The benzyl groups may be removed from the fully protected hyxapeptide ester by hydrogenolysis and the partially deprotected ester converted to the hydrazide by reaction with an alcoholic solution of hydrazine at room temperature.

The resulting 1–6-hexapeptide hydrazide was then converted to the azide and reacted with the partially deprotected docosopeptide 7–28 sequence in the manner described above to provide protected V.I.P. The resulting product was treated to remove the protecting groups and form V.I.P. or one of the salt forms mentioned above.

It will be obvious after becoming aware of the teachings of this application that the method of preparation of the individual fragments or sequences employed in the present invention may be varied without departing from the scope thereof. It is further clear that the sequence of coupling can be varied from that set forth in the specification. Thus, since it is very clear that any combination of fragment building and sequence coupling reactions may be carried out to join the 1–6, 7–13, 14–17 and 18–28 sequences, the particular series of reactions described in the examples of this application are not considered to be a limitation on the scope of the invention.

It is further to be appreciated that while the V.I.P. material has been isolated from animal intestines, this application represents the first successful synthesis of V.I.P. and that the intermediates and derivatives disclosed herein, whether or not they contain blocking or protecting groups thereon, represent novel compounds.

It is also to be appreciated that this invention is inclusive of the salts of V.I.P. which may include the hydrochlorides, hydrobromides, salts of weak organic acids such as acetates, citrates, tartrates, oxalates, ascorbates, trifluoroacetate, and chloroacetates such as dichloroacetate. In particular the invention is inclusive of those salts which are pharmacologically acceptable for the fields of use indicated. These salts may be formed by reaction of the protected or free product with the required acid.

The following examples are given for the purpose of illustration and not by way of limitation. In these examples and throughout the specification parts are by weight unless otherwise indicated. All temperatures are in °C.

In the following specific examples, Example 1 shows preparation of the 18–28 sequence described above, Example 2 shows preparation of the 14–17 sequence, Example 3 shows preparation of the 7–13 sequence, and Example 4 shows preparation of the 1–6 sequence. Thereafter, Example 5 describes coupling of the 18–28 sequence with the 14–17 sequence to provide the 14–28 sequence, Example 6 describes coupling of the 14–28 sequence from Example 5 with the 7–13 sequence from Example 3 to form the 7–28 sequence, and Example 7 shows coupling of the 7–28 sequence from Example 6 with the 1–6 sequence from Example 4 to form the protected 1–28 sequence or protected V.I.P. followed by removal of the blocking groups to produce a V.I.P. salt. Examples 8, 9 and 10 show additional embodiments of the invention as described hereinafter.

EXAMPLES

In the following examples, capillary melting points are reported uncorrected. Thin-layer chromatograms (silica gel, Merck) were developed with the following solvent systems in which parts are by volume: A: n-butanol-acetic acid-water (4:1:1); B: n-butanol-pyridine-acetic acid-water (30:20:6:24); C: chloroformmethanol (9:1); DL ethyl acetate-pyridine-acetic acid-water (60:20:6:11). Spots were revealed by uv, charring with ammonium hydrogen sulfate, modified Rydon-Zahn reagent, and Pauly's and Sakaguchi reagents. For amino acid analysis, samples were hydrolyzed with constant boiling hydrochloric acid in evacuated, sealed ampoules at 110°C. for 16 hours, and analyzed by the method of Spackman, Stein and Moore on a Beckman-Spinco 120C instrument.

EXAMPLE 1

A. Benzyloxycarbonyl-L-Leucyl-L-Asparaginamide

A suspension of Z-asn-$NH_2$ (6.66 g.) in acetic acid (25 ml.) was treated with 4 N HBr in acetic acid (25 ml.). After 1 hour at room temperature dry ether (600 ml.) was added; the resulting hydrobromide of asn-$NH_2$ was collected by filtration, washed with ether, and dried in vacuo over NaOH and $P_2O_5$ for 1 hour. Z-leu-ONP (1.23 g.) was added to a solution of asn-$NH_2$ hydrobromide and triethylamine (3.5 ml.). in DMF (125 ml.). The reaction mixture was kept slightly alkaline by the addition of triethylamine (1.5 ml.) in samll portions. After standing overnight, the mixture was cooled with ice water and diluted with $CHCl_3$ (250 ml.). The product was filtered, washed with $CHCl_3$ (125 ml.) and EtOAc (40 ml.), and dried in air to give 8.78 g. of Z-leu-asn-$NH_2$ (93 percent), m.p. 233-235°C. A sample was recrystallized from DMF-$CHCl_3$ and from DMF-$H_2O$: m.p. 238°–239°C. dec.; $[\alpha]_D^{25}$ − 7.5° (c 1, DMF); tlc $R_fA$ 0.73, $R_fB$ 0.69.

B. Benzyloxycarbonyl-L-Isoleucyl-L-Leucyl-L-Asparaginamide

To a suspension of Z-leu-asn-$NH_2$ (756 mg.) in acetic acid (3.5 ml.) was added 4 N HBr in acetic acid (3.5 ml.). After 1 hour at room temperature, the mixture was diluted with ether (100 ml.), and the hydrobromide of leu-asn-$NH_2$ was collected on a filter, washed with ether, and dried in vacuo. Z-ile-ONP (1.16 g.) was added to a solution of leu-asn-$NH_2$ and triethylamine (0.28 ml.) in DMF (5 ml.). After about 30 minutes, the product started to separate. The mixture was kept alkaline by the addition of triethylamine (0.6 ml.). Next day $CHCl_3$ (20 ml.) was added to the cooled mixture. The solid mass was disintegrated, filtered, washed with $CHCl_3$ (40 ml.) and EtOAc (20 ml.), and dried in air. The Z-ile-leu-asn-$NH_2$, 865 mg. (87 percent), melted at 267°–268°C. dec. Amino acid analysis: ile, 1.0; leu, 1.1; asp, 0.9; $NH_3$, 2.2.

C. N-Benzyloxycarbonyl-O-Benzyl-L-Seryl-L-Isoleucyl-L-Leucyl-L-Asparaginamide

The protecting group was removed from Z-ile-leu-asn-$NH_2$ (2.95 g.) with 4 N HBr in AcOH (14 ml.) added to a suspension thereof in AcOH (14 ml.). The hydrobromide of ile-leu-asn-$NH_2$ was isolated by addition of ether (400 ml.), as described in 2 B. above. This tripeptide hydrobromide was suspended in DMF (40 ml.); diisopropylethylamine (1.0 ml.) was added followed by a solution of N-Z-O-BZL-ser-ONP (3.8 g.) in DMF (10 ml.). The mixture was kept alkaline by the addition of diisopropylethylamine (1.6 ml.) in small portions. After 48 hours, EtOH (50 ml.) was added, the semisolid mass disintegrated, filtered, washed with EtOH (60 ml.) and EtOAc (30 ml.), and dried in air to give N-Z-O-BZL-ser-ile-leu-asn-$NH_2$ 3.35 g. (84 percent); mp 266°–267°C. dec. Amino acid analysis: ser, 0.8; ile, 1.0; leu, 1.0; asp, 1.0; $NH_3$, 2.0. For characterization a small sample of N-Z-O— BZL-sen-ile-leu-asn-$NH_2$ was hydrogenated and converted to the trifluoroacetate: mp 235°–236°C.; $[\alpha]_D^{25} - 27.5°$ (c 1, 80 percent AcOH); tlc $R_fA$ 0.32, $R_fB$ 0.62. Amino acid analysis: ser, 0.9; ile, 1.0; leu, 1.0; asp, 1.0; $NH_3$, 2.0.

D. Benzyloxycarbonyl-L-Asparaginyl-L-Seryl-L-Isoleucyl-L-Leucyl-L-Asparaginamide A suspension of the product of Example 1 C. (2.2 g.) in 80 percent AcOH (150 ml.) was hydrogenated for 24 hours in the presence of a 10 percent palladium-on-charcoal catalyst (0.45 g.). The catalyst was removed by filtration and the solvent evaporated in vacuo to leave a crystalline residue of ser-ile-leu-asn-$NH_2$ that weighed 1.79 g. after drying in vacuo. It was finely powdered, suspended in DMF (25 ml.) and treated with Z-asn-ONP (1.82 g.). Within an hour, the reaction mixture turned into a semisolid mass. Two days later this mass was disintegrated with THF (75 ml.); the product was filtered and then washed with THF (180 ml.), with EtOH (100 ml.), and once more with THF (60 ml.). The air-dried material, Z-asn-ser-ile-leu-asn-$NH_2$, 1.8 g. (79 percent), mp 270°–271°C. dec., was used as such in the next step. Amino acid analysis: asp, 2.0; ser, 0.9; ile, 1.1; leu, 1.0; $NH_3$, 3.0. For further characterization, a small sample was hydrogenated and converted to the trifluoroacetate: mp 210°–211°C. dec.; $[\alpha]_D^{25} - 32.5°$ (c 1, 80 percent AcOH), tlc $R_fA$ 0.29, $R_fB$ 0.47.

E. Benzyloxycarbonyl-L-Leucyl-L-Asparaginyl-L-Seryl-L-Isoleucyl-L-Leucyl-L-Asparaginamide Hydrogenation of the Example 1 D. product (1.25 g.) in 80 percent AcOH (150 ml.), in the presence of 10 percent palladium-on-charcoal (0.35 g.), was carried out as described in Example 1 D. The resulting acetate of asn-ser-ile-leu-asn-$NH_2$ was powdered and suspended in DMF (15 ml.). After the addition of Z-leu-ONP (1.05 g.), the mixture solidified within an hour. Two days later the semisolid mass was disintegrated with THF (50 ml.), and the solid was washed on a filter with THF (50 ml.) and EtOH (50 ml.), and then dried in air to give Z-leu-asn-ser-ile-leu-asn-$NH_2$ 1.27 g. (88 percent); mp 260°–261°C. dec. Amino acid analysis: leu, 2.0; asp, 2.1; ser, 0.9; ile, 1.0; $NH_3$, 3.2. A sample was hydrogenated and converted to the trifluoroacetate: mp 224°–266°C.; $[\alpha]_D^{25} - 30°$C. (c 1, 80 percent AcOH); tlc $R_fA$ 0.40, $R_fB$ 0.62.

F. N-Benzyloxycarbonyl-O-Benzyl-L-Tyrosyl-L-Leucyl-L-Asparaginyl-L-Seryl-L-Isoleucyl-L-Leucyl-L-Asparaginamide A suspension of the Example 1 E. product (966 mg.) in 80 percent AcOH (120 ml.) was hydrogenated for 7 hours in the presence of a 10 percent palladium-on-charcoal catalyst. The resulting acetate of leu-asn-ser-ile-leu-asn-$NH_2$ (870 mg.) was powdered and suspended in DMF (10 ml.). After the addition of Z-O-BZL-tyr-ONP (948 mg.), a semisolid mass was formed within an hour. The next morning, this mass was disintegrated with THF (25 ml.) and washed on a filter with THF (40 ml.), ethylacetate (30 ml.), and dried to give N-Z-O-BZL-tyr-leu-asn-ser-ile-leu-asn-$NH_2$: 1.23 g. (88 percent); mp 263°–264°C. dec. A small sample of this material was hydrogenolyzed in 80 percent AcOH and the resulting acetate (100 mg.) was dissolved in a mixture of methanol (50 ml.) and $H_2O$ (50 ml.) for characterization. The solution was applied to a column of Biorex 70 ($H^+$ form, 1.1 × 40 cm). The column was washed with the same solvent mixture (500 ml.), and the purified material was eluted with a 1:1 mixture of methanol and 8 percent AcOH. The ninhydrin-positive fractions were pooled, concentrated in vacuo, and lyophilized. After a second lyophilization from $H_2O$, 30 mg. of tyr-leu-asn-ser-ile-leu-asn-$NH_2$ were secured: mp 234°–236°C.; $[\alpha]_D^{25} - 13.5°$ (c 1.8, 80 percent AcOH); tlc $R_fA$ 0.46, $R_fB$ 0.62. The bulk of this product however, was not hydrogenolyzed but was used in protected form in the following Example 2 G.

G. $N^\alpha$-t-Butyloxycarbonyl-$N^\epsilon$-Benzyloxycarbonyl-L-Lysyl-L-Tyrosyl-L-Leucyl-L-Asparaginyl-L-Seryl-L-Isoleucyl-L-Leucyl-L-Asparaginamide Hydrogenation of the product of Example 1 F (1.04 g.) overnight in 80 percent AcOH (100 ml.), in the presence of a 10 percent palladium-on-charcoal catalyst, resulted in tyr-leu-asn-ser-ile-leu-asn-$NH_2$ (950 mg.). A suspension of this material in DMF (8 ml.) was treated with $N^\alpha$-tBOC-$N^\epsilon$-Z-lys-ONP (750 mg.). Within 1 hour the reaction mixture solidified. Two days later, ethanol (50 ml.) was added, and the disintegrated solid was washed on a filter with EtOH (50 ml.), EtOAc (20 ml.) and dried in air to give the title compound (890 mg.) (83 percent); mp 254°–255°C. dec. For characterization of this intermediate, a sample (100 mg.) was dissolved in TFA (1 ml.), the TFA removed in vacuo after 10 minutes, and the residue triturated with ether (50 ml.). The trifluoroacetate was washed with ether and dried in vacuo over NaOH and $P_2O_5$. It was dissolved in a mixture of methanol (75 ml.) and $H_2O$ (75 ml.), and applied to a column of Dowex 1-X8 (acetate form, 2 × 19 cm.). The eluate was applied directly to a column of Biorex 70 ($H^+$ form, 1.1 × 40 cm). The column was washed with the same solvent mixture. The purified $N^\epsilon$-Z-lys-tyr-leu-asn-ser-ile-leu-asn-$NH_2$ was secured as described in Example 1F except that it was lyophilized twice from AcOH: 40 mg. mp 210° –212°C., $[\alpha]_D^{25} - 19.0°$(c 1, 80 percent AcOH), gave a single spot on tlc, $R_8A$ 0.60, $R_fB$ 0.70.

H. t-Butyloxycarbonyl-$N^\epsilon$-benzyloxycarbonyl-L-lysyl-$N^\epsilon$-benzyloxycarbonyl-L-lysyl-L-tyrosyl-L-leucyl-L-asparaginyl-L-seryl-L-isoleucyl-L-leucyl-L-asparaginamide t-Butyloxycarbonyl-$N^\epsilon$-benzyloxycarbonyl-L-lysl-L-tyrosyl-L-leucyl-L-asparaginyl-L-seryl-L-isoleucyl-L-leucyl-L-asparaginamide from Example 1G (5.42 g) was suspended in acetic acid (15 ml), the suspension cooled in ice, and TFA (35 ml) added. After 25 minutes at room temperature, the acids were rapidly removed in vacuo and ether (250 ml) was added. The product was filtered, washed with ether (100 ml) and dried in vacuo. Yield: 5.32 g (97 percent); mp 247°–249°(dec., softens at 238°); $[\alpha]_D^{25} - 26°$ (c 1, 80 percent AcOH).

This octapeptide amide trifluoroacetate (5.3 g) was powdered and suspended in DMF (40 ml). Triethylamine (0.61 ml) was added, followed by t-butyloxycarbonyl-$N^\epsilon$-benzyloxycarbonyl-L-lysine p-nitrophenyl ester (4.5 g). The reaction mixture was kept slightly alkaline by the addition of the same base.

After 3 days, the semisolid mass was disintegrated under ethanol (150 ml). The product was filtered, washed with ethanol (150 ml), ethyl acetate (100 ml), and dried in air to give 5.86 g (92 percent); mp 240°–259° (dec., softens at 246°). The material was too insoluble for tlc. Amino acid analysis: Lys, 2.0; Tyr, 0.9; Leu, 2.2; Asp, 2.0; Ser. 0.9; Jle, 1.0; NH$_3$, 3.0.

Anal. Calcd for $C_{71}H_{106}N_{14}O_{19}$ (1459.7): C, 58.4; H, 7.3; N, 13.4. Found: C, 58.5; H, 7.1; N, 13.8.

I. t-Butyloxycarbonyl-L-valyl-N$^\epsilon$-benzyloxycarbonyl-L-lysyl-N$^\epsilon$-benzyloxycarbonyl-L-lysyl-L-tyrosyl-L-leucyl-L-asparaginyl-L-seryl-L-isoleucyl-L-leucyl-L-asparaginamide The protected nonapeptide amide from Example 1H (1.46g) was suspended in acetic acid (3 ml.). The suspension was cooled and TFA (7 ml) was added. After 25 minutes at room temperature, the acids were removed in vacuo, dry ether (150 ml) was added and the product filtered, washed with ether (100 ml) and dried in vacuo over NaOH and P$_2$O$_5$ to give 1.47 g trifluoroacetate (quantitative); mp 246°–250°; $[\alpha]_D^{25}$ − 24° (c 0.5, 80 percent AcOH). The trifluoroacetate was suspended in DMF (15 ml), triethylamine (0.13 ml) was added, followed by t-butyloxycarbonyl-L-valine N-hydroxysuccinimide ester (1.41 g). The reaction mixture was kept slightly basic. After 6 days, the semisolid mixture was disintegrated under ethanol (60 ml). The product was filtered, washed with ethanol (50 ml), ethyl acetate (20 ml), and dried in air; 1.41 g (90 percent); mp 263°–264°; too insoluble for tlc. Amino acid analysis: Val, 0.9; Lys, 2.1; Tyr, 0.8; Leu, 2.2; Asp, 2.2; Ser, 1.0; Ile, 1.0; NH$_3$, 3.0.

Anal. Calcd. for $C_{76}H_{115}N_{15}O_{20}$ (1558.8): C, 58.6; H, 7.4; N, 13.5. Found: C, 58.7; H, 7.4; N, 13.4.

J. t-Butyloxycarbonyl-L-alanyl-L-valyl-N$^\epsilon$-benzyloxycarbonyl-L-lysyl-N$^\epsilon$-benzyloxycarbonyl-L-lysyl-L-tyrosyl-L-leucyl-L-asparaginyl-L-seryl-L-isoleucyl-L-leucyl-L-asparaginamide The t-butyloxycarbonyl group was removed from the protected decapeptide amide of Example 1-I with 1-IA as described above (1.4 g). Yield: 1.38 g (98 percent); mp 230°–233°; $[\alpha]_D^{25}$ − 28° (c 1, 80 percent AcOH). This trifluoroacetate was then suspended in DMF (10 ml), triethylamine (0.12 ml) was added, followed by t-butyloxycarbonyl-L-alanine p-nitrophenyl ester. After 3 days, the product was isolated as described for Example 1I. Yield: 1.34 g (94 percent); mp 271°–273°. Amino acid analysis: Ala, 1.0; Val, 1.0; Lys, 2.0; Tyr, 0.8; Leu, 2.1; Asp, 2.1; Ser. 0.9; Ile, 1.0; NH$_3$, 3.0.

Anal. Calcd for $C_{79}H_{120}N_{16}O_{21}$ (1629.9); C, 58.2; H, 7.4; N, 13.7. Found: C, 57.9; H, 7.4; N, 13.5.

EXAMPLE 2

A. t-Butyloxycarbonyl-L-Glutaminyl-L-Methionine Methyl Ester tBOC-gln-ONP (7.34 g, 20 mmole) was added to a solution of L-methionine methyl ester hydrochloride (4.2 g., 21 mmole) and triethylamine (2.94 ml.) in DMF (30 ml). After 5 hours ethylacetate (300 ml) was added and the organic phase was washed with 2 percent citric acid (3 × 20 ml), 0.5 M ammonium hydroxide until free of nitrophenol, 2 percent citric acid (20 ml), water until neutral and saturated solution of sodium chloride (20 ml). The solution was dried over sodium sulfate, filtered and concentrated in vacuo. Petroleum ether (100 ml) was added, the precipitate filtered, washed with the same solvent (20 ml) and dried in air to give 7.0 g. (90 percent) of tBOC-gln-met-OMe, mp 110°–111°. Repreciptation from ethylacetate petroleum ether did not change the mp $[\alpha]_D$ − 17°(c 1, DMF), tlc $R_fA$ 0.72, $R_fB$ 0.74.

B. t-Butyloxycarbonyl-N$^\epsilon$-Benzyloxycarbonyl-L-Lysysl-L-Glutaminyl-L-Methionine Methyl Ester The protected dipeptide ester of Example 2A (3.13 g., 8 mmole) was dissolved in TFA (25 ml.). After 10 minutes the TFA was removed in vacuo and dry ether (200 ml) was added. The ether was decanted and the residue washed with ether (100 ml). The oily material was dried over NaOH and P$_2$O$_5$. The yield of the TFA salt of gln-met-OMe was quantitative, tlc $R_fA$ 0.42, $R_fB$ 0.61. This trifluoroacetate salt (3.24 g., 8 mmole), triethylamine (1.12 ml) and tBOC-N$^\epsilon$-Z-lys-ONP (4.8 g., 9.6 mmole) were dissolved in DMF (15 ml). The reaction mixture was kept basic with small amounts of triethylamine. After reaction overnight, the mixture was stored at 0°C. for several hours. The product was filtered, washed with ethylacetate (25 ml) and dried in air to give 2.77 g. of tBOC-N$^\epsilon$-Z-lys-gln-met-OMe (53 percent), mp 146°–147°, tlc $R_fA$ 0.80, $R_f$ B 0.70.

For additional material, the filtrate was concentrated in vacuo and treated with unsdimethylethylenediamine (0.5 ml). After 2 hours ethylacetate (200 ml) was added and the product isolated as described above. Yield: 1.26 g (24 percent), mp 146°–147°. A sample was recrystallized from ethanol, mp 146°–147°; $[\alpha]_D^{25}$ −18°(c 1, DMF).

C. t-Butyloxycarbonyl-L-Arginyl-N$^\epsilon$-Benzyloxycarbonyl-L-Lysyl-L-Glutaminyl-L-Methionine Methyl Ester Hydrochloride The protected tripeptide ester of Example 2B (955 mg) was suspended in a mixture of acetic acid (2.7 ml) and anisole (0.3 ml). After cooling, TFA (6.3 ml), was added and the resulting clear solution allowed to stand 25 minutes at room temperature. The acids were removed in vacuo and dry ether (50 ml) was added. The ether was decanted and the residue was dissolved in ice-cold water (40 ml.). A cold solution of sodium carbonate (155 mg.) in water (10 ml.) was added and the free base was extracted into ethylacetate (100 ml., then 4 × 30 ml.). The organic phase was washed with water (2 × 20 ml), saturated sodium chloride solution (20 ml), dried over sodium sulfate, filtered and evaporated in vacuo. The yield was 602 mg:, mp 129°–131°; tlc $R_fA$ 0.43, $R_fB$ 0.60. The partially deprotected tripeptide, N$^\epsilon$-Z-lys-gln-met-OMe (600 mg), was dissolved in DMF (3 ml.). The solution was cooled and then tBOC-arg-HCl (426 mg.) and DCC (282 mg.) were added. Two hours later a second portion of tBOC-arg-HCl (155 mg.) and DCC (103 mg.) were added and the reaction allowed to proceed at room temperature. Next day the dicyclohexylurea was removed by filtration and washed with DMF (3 × 2 ml.). The DMF was removed in vacuo and the oily residue applied in methanol to a LH-20 column (2.5 × 80 cm.) pre-equilibrated with the same solvents. Fractions of 5 ml. were collected, with flow rate of 20 ml./hr. The fractions which contained the desired product were pooled, evaporated and rechromatographed under the same conditions. Yield: 580 mg. of tBOC-arg-N$^\epsilon$-Z-lys-gln-met-OMe-HCl $[\alpha]_D^{25}$ − 26° (c 1, methanol) tlc $R_fA$ 0.56, $R_fB$ 0.60.

D. t-Butyloxycarbonyl-L-Arginyl-N$^\epsilon$-Benzyloxycarbonyl-L-lysyl-L-Glutaminyl-L-Methionyl Hydrazide Hydrochloride The protected tetrapeptide ester of Example 2C (825 mg.) was dissolved in methanol (4.5 ml.). Hydrazine (0.5 ml.) was added and after 3 hours at room temperature the solvent was removed in vacuo and the oily residue dried over $H_2SO_4$. Next day the amorphous product was suspended in methanol (2 ml.) and precipitated with ether (50 ml.). It was filtered, washed with ether (20 ml.) and dried over $H_2SO_4$ to give 780 mg. of tBOC-arg-N$^r$-Z-lys-gln-met-NHNH$_2$ hydrochloride; mp 152°–154°. Reprecipitation of a sample from methanol-ether raised the mp to 155°–157° $[\alpha]_D^{25} - 14°$ (c 1, DMF), tlc $R_fA$ 0.52, $R_fB$ 0.63, $R_fC$ 0.60.

EXAMPLE 3

A. t-Butyloxycarbonyl-L-Threonyl-Nitro-L-Arginyl-L-Leucine Methyl Ester

Z-NO$_2$-arg-leu-OMe (3.85 g., 8 mmole) was treated with 4 N HBr in AcOH (32 ml.). After 1 hour at room temperature, the hydrobromide of NO$_2$-arg-leu-OMe was precipitated with ether (100 ml.), washed with more ether (2 × 50 ml.), filtered, and dried over NaOH. The hydrobromide was dissolved in a mixture of DMF (5 ml.) and CH$_2$Cl$_2$ (25 ml.), and the amine liberated by the addition of triethylamine (2 ml.). tBOC-thr (2 g., 9mmole) and EEDQ (2.5g., 10 mmole) were added and the mixture stirred overnight. Next morning, 50 ml. more CH$_2$Cl$_2$ was added, the solution washed with a 20 percent solution of citric acid, H$_2$O, 0.5 N KHCO$_3$ and H$_2$O (each 50 ml.), dried and evaporated. The residue solidified on trituration with ether, it was filtered and washed with ether: yield, 3.7 g. On tlc, tBOC-thr-NO$_2$-arg-leu-OMe moves with an $R_fC$ of 0.30. The protected tripeptide ester was purified by silica gel chromatography on a 2.5 × 78 cm column, prepared with CHCl$_3$, 3 percent MeOH in CHCl$_3$ eluted the impurity, 5 percent MeOH in CHCl$_3$ eluted 2 g. (45.6 percent) of the desired tripeptide, which has no well defined mp: $[\alpha]_D^{25} - 13°$ (c 1, DMF); tlc $R_fA$ 0.62, $R_fB$ 0.66, $R_fC$ 0.30.

B. t-Butyloxycarbonyl-O-Benzyl-L-Tyrosyl-L-Threonyl-Nitro-L-Arginyl-L-Leucine methyl Ester The protected tripeptide of Example 3 A (3.52 g., 6.4 mmole) was dissolved in TFA (15 ml.). After 10 minutes, the TFA was evaporated in vacuo, dry ether (200 ml.) was added, and the product was collected by filtration. It was washed with dry ether (100 ml.) and dried in vacuo over NaOH and P$_2$O$_5$ to give the trifluoroacetate of thr-NO$_2$-arg-leu-OMe: 3.42 g. (95 percent); mp 95°–97°; tlc $R_fA$ 0.45, $R_fB$ 0.67.

A solution of this product (3.42 g., 6.1 mmole) in DMF (13 ml.) was neutralized with triethylamine (0.85 ml.). tBOC-O-BZL-tyr-ONP (3 g., 6.1 mmole) was added and the reaction mixture kept slightly basic by the addition of small amounts of the same base. After three days, the mixture was diluted with ethyl acetate (300 ml.), washed with 5 percent citric acid (60 ml.) with 0.5 N ammonium hydroxide until free of p-nitrophenol, 5 percent citric acid (20 ml.), water (3 × 20 ml.) and saturated sodium chloride solution (20 ml.). It was dried over sodium sulfate, filtered and evaporated in vacuo. The residue was dissolved in methanol (15 ml.) and precipitated by the addition of cold water (200 ml.). The product was collected by filtration, washed with water (30 ml.), and dried in air. Yield of tBOC-O-BZL-tyr-thr-NO$_2$-arg-leu-OMe: 4.8 g. (98 percent); mp 99°–101° (softens at 89°–90°). The mp remains unchanged after reprecipitation from methanol-water and then from ethyl acetate-light petroleum ether. $[\alpha]_D^{25} - 7°$ (c 1, DMF); tlc $R_fA$ 0.80, $R_fB$ 0.80, $R_fC$ 0.36.

C. t-Butyloxycarbonyl-L-Asparaginyl-O-Benzyl-L-Tyrosyl-L-Threonyl-Nitro-L-Arginyl-L-Leucine Methyl Ester The protected tetrapeptide from Example 3 B (4.8 g., 6 mmol) was dissolved in TFA (20 ml.). After 8 minutes, the TFA was evaporated in vacuo. Dry ether (200 ml.) was added; the product was collected by filtration, washed with ether (100 ml.) and dried in vacuo over NaOH and P$_2$O$_5$ to give 4.78 g. (98 percent) of O-BZL-tyr-thr-NO$_2$-arg-leu-OMe trifluoroacetate; mp 73°–76°; tlc $R_fA$ 0.68, $R_fB$ 0.69.

This product (4.78 g., 5.9 mmol), triethylamine (0.82 ml.) and tBOC-asn-ONP (2.14 g.) were dissolved in DMF (18 ml.). After 2 days, more active ester (706 mg.) was added. Next day, the reaction mixture was poured slowly into ethyl acetate (200 ml.), the precipitate filtered, washed with ethyl acetate (4 × 15 ml.) and dried in air to give 3.72 g. of tBOC-asn-O-BZL-tyr-thr-NO$_2$-arg-leu-OMe, mp 169°–170°. The filtrate was concentrated to a small volume and a second crop (1.27 g., mp 169°–170°) was isolated by the addition of ethyl acetate (200 ml.). The total yield is 92 percent. Reprecipitation of a sample from methanol-water raised the mp to 171°–172°; $[\alpha]_D^{25} - 16.5°$ (c 1, DMF); tlc $R_fA$ 0.74, $R_fB$ 0.80, $R_fC$ 0.27.

D. t-Butyloxycarbonyl-β-Benzyl-L-Aspartyl-L-Asparaginyl-O-Benzyl-L-Tyrosyl-L-Threonyl-Nitro-L-Arginyl-L-Leucine Methyl Ester The protected pentapeptide of Example 3 C (4.58 g., 5 mmol) was dissolved in TFA (20 ml.). After 8 minutes, the TFA was removed in vacuo and the trifluoroacetate of asn-O-BZL-tyr-thr-NO$_2$-arg-leu-OMe isolated as described in Example 3 B. Yield: 4.31 g. (95 percent); mp 82°–84°; tlc $R_fA$ 0.53; $R_fB$ 0.66.

This pentapeptide ester trifluoroacetate (4.27 g., 4.6 mmol), triethylamine (0.64 ml.) and tBOC-BZL-asp-ONP (2.65 g.) were dissolved in DMF (10 ml.). After about 16 hours the reaction mixture was poured slowly into ethyl acetate (200 ml.), the product filtered, washed with ethyl acetate (4 × 15 ml.), ether (2 × 10 ml.), and air dried to give 4.36 g. (86 percent) of tBOC-BZL-asp-asn-O-BZL-tyr-thr-NO$_2$-arg-leu-OMe, mp 187°–188.5°. Reprecipitation of a sample from DMF-water did not change the mp $[\alpha]_D^{25} - 16°$ (c 1, DMF); tlc $R_fA$ 0.77, $R_fB$ 0.74, $R_fC$ 0.34.

E. t-Butyloxycarbonyl-L-Threonyl-β-Benzyl-L-Aspartyl-L-Asparaginyl-O-Benzyl-L-Tyrosyl-L-Threonyl-Nitro-L-Arginyl-L-Leucine Methyl Ester The protected hexapeptide of Example 3 D (3.92 g., 3.5 mmol) was dissolved in TFA (15 ml.). After 10 minutes, the TFA was removed in vacuo and the TFA salt of BZL-asp-asn-BZL-tyr-thr-NO$_2$-arg-leu-OMe isolated as described in Example 3 B. Yield: 3.89 g. (98 percent); mp 193°–194°; tlc $R_fA$ 0.59, $R_fB$ 0.69.

This hexapeptide ester trifluoroacetate (3.89g.), triethylamine (0.48 ml.) and tBOC-thr-ODNP (5.25 mmol) were dissolved in DMF (12 ml.). The reaction mixture was kept slightly basic by the addition of small amounts of the same base. Next day, it was poured slowly into ethyl acetate (200 ml.). The product was filtered, washed with ethyl acetate (4 × 10 ml.) and ether (4 × 10 ml.), and air dried to give 2.9 g. (68 percent) of tBOC-thr-BZL-asp-asn-BZL-tyr-thr-NO$_2$-arg-leu-OMe; mp 194°–196°. A second crop was isolated from the combined filtrate, yield 500 mg. (12%), mp 194°–196°. Reprecipitation of a sample from DMF-ethyl acetate and from DMF-water did not raise the mp $[\alpha]_D^{25} - 18°$ (c 1, DMF), tlc R$_f$A 0.8, R$_f$B 0.8, R$_f$C 0.19.

F. t-Butyloxycarbonyl-L-Threonyl-L-Aspartyl-L-Asparaginyl-L-tyrosyl-L-Threonyl-L-Arginyl-L-Leucine Methyl Ester The fully protected heptapeptide of Example 3 E (2.69 g., 2.2 mmol) was suspended in 90 percent aqueous methanol (500 ml.), containing acetic acid (0.6 ml.), and hydrogenated in the presence of 10 percent palladium on charcoal catalyst (820 mg.) for 48 hours. The reaction mixture was filtered from the catalyst and evaporated to a small volume. Ethanol (10 ml.) was added and the suspension reevaporated. The residue was then suspended in ethanol (10 ml.) and precipitated with ether (200 ml.). The product was filtered, washed with ether (30 ml.) and dried in air. Yield: 2.03 g. (92 percent) of tBOC-thr-asp-asn-tyr-thr-arg-leu-OMe, mp 171–173° (dec.). The mp remained unchanged on reprecipitation from methanol with ether. $[°]_D^{25} - 21°$ (c 1, DMF); tlc R$_f$A 0.51, R$_f$B 0.67.

For characterization and identification, a sample (40 mg.) of this product was treated with TFA (0.4 ml.) for 10 minutes. After the removal of the TFA in vacuo, the residue was triturated with ether (10 ml.), filtered, washed with ether, and dried in vacuo over P$_2$O$_5$ and NaOH to give the heptapeptide methyl ester trifluoroacetate.

G. t-Butyloxycarbonyl-L-Threonyl-L-Aspartyl-L-Asparaginyl-L-Tyrosyl-L-Threonyl-L-Arginyl-L-Leucine Hydrazide The partially protected heptapeptide obtained in Example 3 F, paragraph 1, (1.71 g., 1.7 mmol) was suspended in methanol (36 ml.), cooled with ice-water, and hydrazine (97%, 4 ml.) was added. A clear solution resulted. After 3 hours at room temperature, the solvent was evaporated in vacuo and the oil residue was dried overnight H$_2$SO$_4$. The amorphous material was suspended in methanol (10 ml.) and precipitated with ether (200 ml.). The product was filtered, washed with ether (30 ml.) and dried in vacuo over H$_2$SO$_4$. Yield: 1.64 g. (97 percent) of tBOC-thr-asp-asn-tyr-thr-arg-leu-NHNH$_2$; mp 171°–172° (dec.). After reprecipitation of a sample from methanol with ether, the mp remained the same. $[\alpha]_D^{25} - 6°$ (c 1, DMF); tlc R$_f$A 0.44, R$_f$B 0.72, R$_f$D 0.13.

EXAMPLE 4

A. Benzyloxycarbonyl-L-Alanyl-L-Valyl-L-Phenylalanine Methyl Ester

Z-val-phe-OMe (3.3 g., 8mM) was suspended in 95 percent ethanol (150 ml.) and hydrogenated for 4 hours in the presence of 1.0 N HCL (8.8 ml., 8.8 mM) and 10 percent palladium on charcoal (600 mg.). The solution was filtered and the filtrate was evaporated to dryness at room temperature. The crystalline residue was dried overnight in vacuo to give 2.72 g., tlc R$_f$A 0.60. This hydrochloride of val-phe-OMe was suspended in dichloromethane (150 ml.) and cooled to 0°C. Benzyloxycarbonylala (1.78 g., 8 mM) was added, followed by triethylamine (1.12 ml., 8 mM) and dicyclohexylcarbodiimide (1.65 g., 8 mM). After 15 minutes the product began to separate. Cooling was continued for 30 minutes and the reaction was then allowed to proceed at room temperature for 4 hours. THF (100 ml.) was added to dissolve the product, followed by 4 N HCl (4 ml.). After 10 minutes the precipitate was collected by filtration and washed with THF (3 × 10 ml.). The combined filtrates were evaporated, the residue was dissolved in ethylacetate (200 ml.) and washed with 2 × 15 ml. 1 N HCL, 2 × 15 ml. 1 M NaHCO$_3$, 2 × 15 ml. H$_2$O, and 15 ml. of saturated solution of NaCl. The organic layer was dried over Na$_2$SO$_4$, filtered, and concentrated to a small volume in vacuo. The product was precipitated with petroleum ether (bp 37°–50°C.), collected on a filter, and washed with petroleum ether. The air-dried product Z-ala-val-phe-OMe (3.23 g., 84 percent) melts at 195°–196°C. A sample was recrystallized from hot ethanol (mp 204°–205°C.); $[\alpha]_D^{24} - 5.8°$ (c 1, DMF); tlc R$_f$A 0.68, R$_f$B 0.73.

B. t-Butyloxycarbonyl-$\beta$-Benzyl-L-Aspartyl-L-Alanyl-L-Valyl-L-Phenylalanine Methyl Ester The protected tripeptide from A above (2.9 g. 6 mM) was suspended in acetic acid (18 ml.). hydrobromic acid in acetic acid (4 N, 18 ml.) was added, followed after 1 hour by dry ether (200 ml.). The ether was decanted and hydrobromide was triturated with dry ether (100 ml.) and dried for 1 hour in vacuo over sodium hydroxide and phosphorous pentoxide. The resulting hydrobromide of ala-val-phe-OMe, triethylamine (0.84 ml., 6 mM) and tBOC-$\beta$-BZL-asp-ONP (3.47 g., 7.8 mM) were dissolved in DMF (30 ml.). The reaction mixture was kept slightly basic by the addition of small amounts of the same base. After 2 hours, uns-diethylaminopropylamine (0.25 ml.) was added and 2 hours later ethylacetate (200 ml.) was added. The organic phase was washed with 2 percent citric acid (3 × 20 ml.), 0.5 N ammonium hydroxide until free of p-nitro-phenol, 2 percent citric acid (20 ml.), water (2 × 20 ml.) and saturated sodium solution. It was dried over sodium sulfate, filtered, and evaporated in vacuo. The residue was dissolved in methanol, precipitated with water, collected by filtration and washed with water. The air-dried product tBOC-$\beta$-BZL-asp-ala-val-phe-OMe (3.8 g., 97 percent) melts at 143°–144°C. (softens at 133°C.). A sample was recrystallized from methanol-water, without change in mp; $[\alpha]_D^{24} - 14°$ (c 1, DMF); tlc R$_f$A 0.70, R$_f$B 0.63.

C. t-Amyloxyycarbonyl-O-Benzyl-L-Seryl-$\beta$-Benzyl-L-Aspartyl-L-Alanyl-L-Valyl-L-Phenylalanine Methyl Ester The protected tetrapeptide from part B above was dissolved in TFA (20 ml.). After 10 minutes at room temperature, the TFA was evaporated in vacuo. Dry ether (200 ml.) was added; the product was collected by filtration, washed with dry ether (100 ml.) and dried in vacuo over sodium-hydroxide and phosphorous pentoxide to give 2.62 g. (98 percent); mmp 151°–153°C.; tlc R$_f$A 0.69, R$_f$B 0.69.

The resulting tetrapeptide ester trifluoroacetate (2.6 g.), N-AOC-O-BZL-ser-ONP (prepared from 6 mM N-t-amyl-oxycarbonyl-O-benzyl-L-serine dicyclohexylammonium salt) and N,N-diisopropylethylamine (0.68 ml. 4 mM) were dissolved in DMF (20 ml.). The reaction mixture was kept slightly basic by the addition of small amounts of the base. After standing overnight, uns-diethylaminopropylamine (0.25 ml.) was added and, 2 hours later, ethylacetate (300 ml). The product was isolated as described for the compound of B above. The air-dried AOC-O-BZL-ser-β-BZL-asp-ala-val-phe-OMe (2.95 g., 87%) melts at 145°–146°C. (softens at 135°C.). A sample was dissolved in a large volume of methanol and the volume was reduced until precipitation began: mp 169°–171°C.; [α]$_D^{24}$ − 14 (c 2, DMF); tlc R$_f$A 0.83, R$_f$B 0.76.

D. t-Butyloxycarbonyl-L-Histidyl-O-Benzyl-L-Seryl-β-Benzyl-L-Aspartyl-L-Alanyl-L-Valyl-L-Phenylalinine Hydrazide The protected pentapeptide from part C above was dissolved in TFA (20 ml.). After 10 minutes at room temperature, the TFA was evaporated in vacuo. Dry ether (250 ml.) was added, the product was collected by filtration, washed with dry ether (100 ml.) and dried in vacuo over NaOH and P$_2$O$_5$ to give 2.75 g. (96 percent) of the trifluoroacetate of ser-O-BZL-asp-ala-val-phe-OMe; mp 211°–213°C.; tlc R$_f$A 0.76, R$_f$B 0.76.

This latter product (2.75 g.) was dissolved in DMF (10 ml.) and neutralized with triethylamine (0.46 ml.). It was immediately added to a solution of t-butyloxycarbonyl-L-histidyl azide prepared as follows: 1.35 gr. t-butyloxycarbonyl-L-histidine hydrazide was dissolved in DMF (8 ml.). The solution was cooled in acetone-dry ice bath to −25°C., hydrochloric acid in dioxane (5 ml., 4.78 N) was added, followed by t-butylnitrite (0.75 ml.). After 45 minutes at −25°C., the reaction mixture was cooled to −50°C. and neutralized with triethylamine (3.35 ml.) After 3 days of stirring at 4°C., a second portion of azide (2 mM) in DMF (2 ml.) was added. Next day, the mixture was filtered, the precipitate was washed with DMF (5 ml.), and the DMF was concentrated in vacuo to small volume. Cold water (200 ml.) was added, the product was collected by filtration, washed with water (40 ml.), and dried in vacuo over P$_2$O$_5$ to give 3.07 g. This material was purified by countercurrent distribution in the system chloroform/toluene/methanol/water (5:5:8:2). Two peaks were obtained, with k = 0.39 which is tBOC-his-O-BZL-ser-β-BZL-asp-ala-val-phe-methyl ester and K=3.4 which is the corresponding trifluoroacetate. The slowermoving band yielded 1.32 g. and the faster, 1.06 g. of product. Both materials melted at 168°–170°C.; tlc R$_f$A 0.70, R$_f$B 0.76.

The protected hexapeptide methyl ester from the slower-moving fraction (1.07 g.) was hydrogenated for 24 hours in a mixture of AcOH (8 ml.) and 80% methanol (180 ml.) in the presence of a 10% palladium-on-charcoal- catalyst (300 mg.). The solution was filtered from the catalyst, and evaporated to dryness in vacuo to give 790 mg. of tBOC-his-ser-asp-ala-val-phe-OMe, mp 164°–165°C.; tlc R$_f$A 0.47, R$_f$B 0.59.

This latter material (790 mg.) was suspended in methanol (27 ml.). Hydrazine (3 ml., 97 percent) was added, whereupon a clear solution resulted. After 24 hours the solvent was removed in vacuo and the oil dried overnight over concentrated H$_2$SO$_4$. It was triturated with ether (100 ml.), filtered, washed with ether (50 ml.), and dried to give tBOC-his-ser-asp-ala-val-phe-hydrazide 740 mg.; mp 190°–194°C. (dec.), softens at 186°C.; [α]$_D^{25}$ − 32° (c 1, AcOH); tlc R$_f$A 0.41, R$_f$B 0.36.

EXAMPLE 5

A.     t-Butyloxycarbonyl-L-Arginyl-N$^\epsilon$ -Benzyloxycarbonyl-L-Lysyl-L-Glutaminyl-L-Methionyl-L-Alanyl-L-Valyl-N$^\epsilon$ -Benzyloxycarbonyl-L-Lysyl-N$^\epsilon$ -Benzyloxycarbonyl-L-Lysyl-L-Tyrosyl-L-Leucyl-L-Asparaginyl-L-Seryl-L-Isoleucyl-L-Leucyl-L-Asparaginamide Hydrochloride The protected hendecapeptide amide from Example 1J (1.3g), was treated with a mixture of acetic acid (3 ml.) and TFA (7 ml.), to form the trifluoroacetate of the hendecapeptide amide,

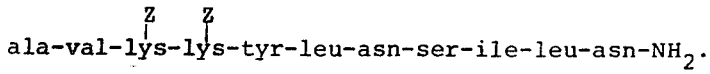

After 25 minutes at room temperature, the acids were removed in vacuo, dry ether (150 ml.) was added and the product filtered, washed with ether (100 ml.) and dried in vacuo over NaOH and P$_2$O$_5$ to give 1.3 g. trifluoroacetate (quantitative); mp 264°–266°C.; [α]$_D^{25}$ − 36° (c 1, 80% AcOH).

A solution of t-Butyloxycarbonyl-L-arginyl-N$^\epsilon$ -benzyloxy-carbonyl-L-lysyl-L-glutaminyl-L-methionine azide was prepared as follows: the tetrapeptide hydrazide prepared as in Example 2D (382 mg.) was dissolved in DMF (5 ml.), the solution cooled to −30° in acetone-dry ice bath. HCl in dioxane (0.44 ml., 4.7 m.) was added, followed by t-butylnitrite (60 μl.) After 30 minutes at −25° to −30° the solution was cooled to −60°. Triethylamine (0.3 ml.) was added, followed by the trifluoroacetate of the crude hendecapeptide amide prepared above (560 mg.) and more base (50 μl.). The suspension was allowed to reach 0°C. gradually and was then stirred in a cold room. After 2 days, additional tetrapeptide hydrazide (216 mg.) was converted to the azide and added to the reaction mixture. After a total of 5 days ethanol (50 ml.) was added, the product filtered, washed with ethanol, ethyl acetate, and air dried to give 600 mg. of tBOC-arg-N$^\epsilon$ -Z-lys-gln-met-ala-val-N$^\epsilon$ -Z-lys-N$^\epsilon$ -Z-lys-tyr-leu-asn-ser-ile-leu-asn-NH$_2$.HCl.

B.   L-Arginyl-L-Lysyl-L-Glutaminyl-L-Methionyl-L-Alanyl-L-Valyl-L-Lysyl-L-Lysyl-L-Tyrosyl-L-Leucyl-L-Asparaginyl-L-Seryl-L-Isoleucyl-L-Leucyl-L-Asparaginamide (Acetate Salt)

The protected pentadecapeptide of Example 5A (80 mg.) and L-methionine (200 mg.) were dissolved in TFA (4.5 ml.) containing anisole (0.5 ml.). HBr gas was bubbled through the solution for 90 minutes. The acids were removed in vacuo and dry ether (25 ml.) was added. The precipitate was filtered, washed with ether (3 × 10 ml.) and dried in vacuo over NaOH + P$_2$O$_5$. The dry material was dissolved in water (100 ml.) and passed through a Dowex-1 column (18 × 2 cm.) in the acetate form. The eluate was made 0.05 M with ammonium acetate and applied to a CMC column (45 × 1.1 cm) which was equilibrated with the same buffer. The column was washed 0.05 N ammonium acetate solution (300 ml.) and then developed with a gradient made of 0.05 M ammonium acetate (500 ml.) and 0.55 m. ammonium acetate (500 ml.). Fractions of 5 ml. were collected, with a flow rate of 20 ml./hour, with UV monitoring at 280 nm. The desired material was located in tubes 130–180. They were pooled, concentrated in vacuo and the residue lyophilized 5 times from water. The produuct moves as a single spot (ninhydrin and Sakaguchi positive) on paper chromatography, with R$_f$B 0.32.

EXAMPLE 6 t-Butyloxycarbonyl-L-Threonyl-L-Aspartyl-L-Asparaginyl-L-Tyrosyl-L-Threonyl-L-Arginyl-L-Leucyl-L-Arginyl-N$^\epsilon$ -Benzyloxycarbonyl-L-Lysyl-L-Glutaminyl-L-Methionyl-L-Alanyl-L-Valyl-N$^\epsilon$ -Benzyloxycarbonyl-L-Lysyl-N$^\epsilon$ -Benzyloxycarbonyl-L-Lysyl-L-Tyrosyl-L-Leucyl-L-Asparaginyl-L-Seryl-L-Isoleucyl-L-Leucyl-L-Asparaginamide Hydrochloride The protected pentadecapeptide of Example 5A above (310 mg.) was suspended in acetic acid (0.9 ml.). The suspension was cooled in an ice-water bath and TFA (2.1 ml.) was added. After 25 minutes at room temperature the acids were removed in vacuo, dry ether (40 ml.) was added, the product filtered, washed with ether (30 ml.) and dried in vacuo over NaOH and P$_2$O$_5$ to give 270 mg. of the trifluoroacetate of the partially deprotected pentadecapeptide, arg-Z-lys-gin-met-ala-val-Z-lys-Z-lys-tyr-leu-asn-ser-ile-leu-asn-NH$_2$, mp 118°–120°, [$\alpha$]$_D^{25}$ − 30° (c 1, 80 percent AcOH).

A solution of tBOC-thr-asp-asn-tyr-thr-arg-leu-N$_3$ was prepared in the following manner: the heptapeptide hydrazide (from example 3 G) (228 mg.) was suspended in DMF (3.5 ml.) and the suspension cooled to −30°. HCl in dioxane (0.24 ml., 4.7 M) was added, followed by t-butylnitrite (41 μl.). After 30 minutes at −25° to −30° the solution of the peptide azide was cooled to −60°, diisopropylethylamine (196 μl.) was slowly added, followed by the partially deprotected pentadecapeptide trifluoroacetate of the immediately preceding paragraph as a fine powder and more base (20 μl.). The suspended material dissolved after ca. 15 minutes. The reaction mixture was allowed to warm up to 0° and then stirred at about 4°. After 3 days an additional amount of the hydrazide (114 mg.) was converted to the azide and added to the reaction mixture. After a total of 5 days ethanol (40 ml.) was added and a small amount of insoluble material was removed by filtration. The ethanol was removed in vacuo and ice water (40 ml.) was added. The precipitate was disintegrated, filtered, and washed with water (20 ml.) and dried in vacuo and ice water (40 ml.) was added. The precipitate was disintegrated, filtered, and washed with water (20 ml.) and dried in vacuo over P$_2$O$_5$ to give 303 mg. of t-BOC-thr-asp-asn-tyr-thr-arg-leu-arg-Z-lys-gln-met-ala-val-Z-lys-Z-lys-tyr-leu-asn-ser-ile-leu-asn-NH$_2$.hydrochloride; (82 percent) tlc; R$_f$A 0.49 with minor spots of R$_f$A 0.41 and R$_f$A 0.56, R$_f$B 0.73 with some streaking.

EXAMPLE 7 t-Butyloxycarbonyl-L-Histidyl-L-Seryl-L-Aspartyl-L-Alanyl-L-Valyl-L-Phenylalanyl-L-Threonyl-L-Aspartyl-L-Asparaginyl-L-Tyrosyl-L-Threonyl-L-Arginyl-L-Leucyl-L-Arginyl-N$^\epsilon$-Benzyloxy-carbonyl-L-Lysyl-L-Glutaminyl-L-Methionyl-L-Alanyl-L-Valyl-N$^\epsilon$ -Benzyloxycarbonyl-L-Lysyl-N$^\epsilon$ -Benzyloxycarbonyl-L-Lysyl-L-Tyrosyl-L-Leucyl-L-Asparaginyl-L-Seryl-L-Isoleucyl-L-Leucyl-L-Asparaginamide Hydrochloride The protected docosapeptide of Example 6 (160 mg.) was deblocked with 70% TFA; 30 percent acid mixture (2 ml.) as described in the first paragraph of Example 6. The yield of partially protected trifluoroacetate was 163 mg. (quantitative), mp 132°–134°, tlc R$_f$A 0.30 with minor spots at R$_f$A 0.1 and at the origin.

The entire amount of peptide obtained in the preceding paragraph was purified by applying it in a small volume of methanol to a column of Sephadex LH-20 (3 × 77 cm.). Fractions of 3.5 ml. were collected at a flow rate of 30 ml./hr., with uv monitoring at 280 μm. The desired material was located in fractions 50–70. These were pooled and evaporated to give substantially pure product, 130 mg., mp -134 to -136, [$\alpha$]$_D^{25}$ + 3°, (c 1, AcOH), tlc R$_f$A 0.30; R$_f$B 0.55.

A solution of t-BOC-his-ser-asp-ala-val-phe-azide was prepared in the following manner: the hexapeptide hydrazide of Example 4 (85 mg.) was suspended in DMF (1.5 ml.) and the suspension cooled to −30°; HCl in dioxane (0.11 ml., 4.7 N) was added, followed by t-butylnitrite (18 μl.). After 30 minutes at −25° to −30°, the solution of azide was cooled to −60°, diisopropylethylamine (86 μl.) was slowly added followed by the docosapeptide trifluoroacetate of the immediately preceding paragraph, (160 mg.) and more base (10 μl.). A clear solution resulted in about 10 minutes. It was allowed to warm up to 0° and then stirred in a cold room, while the pH was maintained slightly basic. After 3 days, ice-water (30 ml.) was added slowly. The precipitate was disintegrated, filtered, washed with water (15 ml.) and dried in vacuo over P$_2$O$_5$ to give the compound of the title, 150 mg., mp 175–180°, tlc R$_f$A 0.34, with minor spots at R$_f$A 0.21, R$_f$A 0.45, R$_f$A 0.51, R$_f$B 0.64 with two minor spots. The protected form of V.I.P. was purified by chromatography on Sephadex LH 20 in methanol. The tBOC and Z protecting groups were removed by treatment with TFA and further purified by countercurrent distribution to give V.I.P., as its trifluoroacetate.

The following examples set forth the preparation of various intermediates which have activity similar to V.I.P. These intermediates may also be used in the preparation of V.I.P. In these examples, Example 8 represents preparation of 18–20 sequence in portions A, and B and portion C is the coupling of the 18–20 sequence with the 21–28 sequence from Example 1G. Example 9 represents preparation of the protected and free 15–28 sequence and Example 10 covers preparation of a novel 15–17 hydrazide.

EXAMPLE 8

A. L-Valyl-N$^\epsilon$ -Benzyloxycarbonyl-L-Lysine

N$^\epsilon$ -Z-lys (3.4 g.) was suspended in water (20 ml.); N NaOH (12 ml.) and dimethoxyethane (20 ml.) were added, followed by tBOC-val-OSu (3.5 g.). The alkalinity of the solution was maintained at about pH 8.5 by the slow addition of N NaOH (12 ml.). When no more NaOH was required, the major part of the solvent was removed with a stream of N$_2$. The mixture was acidified with hydrochloric acid to pH 4 and then with a 20 percent solution of citric acid to pH 3. The gummy precipitate was dissolved in ether, the aqueous layer extracted with ether, and the combined ether solutions (ca 150 ml.) were washed with water, dried over Na$_2$SO$_4$, and the solvent removed in vacuo. The white foamy residue was treated with 95% TFA (15 ml.). About 10 minutes later, the TFA was removed in vacuo, the residue dissolved in ethyl acetate and the solution neutralized (wet indicator paper) with triethylamine. The crystalline precipitate was collected, washed with ethyl acetate, and dried to give 2.9 g. The crude material was purified by recrystallization from hot $H_2O$ (15 ml.) to give chromatographically homogeneous val-$N^\epsilon$-Z-lys: 1.75 g. (48 percent); mp 155°C. dec. (sinters at 100°–110°C.); $[\alpha]_D^{25}$ + 19° (c 1.8, AcOH); tlc $R_fA$ 0.53, $R_fB$ 0.60.

B. Benzyloxycarbonyl-L-Alanyl-L-Valyl-$N^\epsilon$-Benzyloxycarbonyl-L-Lysine

NaOH (1 N) was added to a suspension of the Example 7 H. product (0.76 g.) in $H_2O$ (8 ml.) and pyridine (10 ml.), until solution occured (1.5 ml.). Z-ala-ONP (0.69 g.) was added and complete solution was observed almost immediately. The pH of the mixture was maintained at 9 by the addition of N NaOH (3.5 ml.). When the pH remained constant, the solution was acidified with 2 N HCl. The oily precipitate solified under $H_2O$. It was triturated with ether, filtered, washed with ether and dried. The tripeptide Z-ala-val-$N^\epsilon$-Z-lys, 0.70 g. (58%), mp 187°–189°C., $[\alpha]_D^{25}$ − 2° (c 3, DMF), gave analytical values for a monohydrate.

For characterization, a sample was hydrogenated for 2 hours at room temperature in ethanol (10 ml.) and acetic acid (1 ml) in the presence of a 10 percent palladium-on-charcoal catalyst. After removal of the catalyst and the major part of the solvent, the solution was diluted with ether. The free tripeptide, ala-val-lys (acetate, monohydrate), was collected by filtration. The dried material, 82 mg, mp 215°–218°C. dec., gave a single spot on tlc: $R_fA$ 0.80, $R_fB$ 0.61.

C. L-Alanyl-L-Valyl-L-Lysyl-L-Lysyl-L-Tyrosyl-L-Leucyl-L-Asparaginyl-L-Seryl-L-Isoleucyl-L-Leucyl-L-Asparaginamide The protected octapeptide of Example 1 G (420 mg.) was dissolved in 95% TFA (3 ml.). After 10 minutes at room temperature, the TFA was removed in vacuo and ether was added to the residue. The precipitate was washed on a filter with ether (50 ml.) and dried over NaOH and $P_2O_5$ in vacuo to give 398 mg. (94%) of N-$^\epsilon$-Z-lys-tyr-leu-asn-ser-ile-leu-asn-$NH_2$. A suspension of this material in DMF (3 ml.) was treated with triethylamine (1 equivalent) and then with an ester of the Example 8B title product prepared in the following manner. The Example 8B title product (349 mg.), 1-hydroxybenzotriazole (78 mg.) and DCC (103 mg.) were dissolved in a mixture of DMF (1.5 ml.) and THF (2.5 ml). After one half hour at 0°C. and 3 hours at room temperature, the ir spectrum indicated the disappearance of DCC and the presence of the desired active ester. The mixture was used as such for the acylation of $N^\epsilon$-Z-lys-tyr-leu-asn-ser-ile-leu-asn-$NH_2$. The next day, a second portion of similarly prepared active ester (one third of the former amount) was added. After standing overnight, the reaction mixture was diluted with EtOH (30 ml.); the precipitate was collected by filtration and washed with EtOH (40 ml.), THF (10 ml.), and again with EtOH (20 ml.). The air-dried crude product residue (240 mg.) was dissolved in a mixture of methanol (150 ml.) and $H_2O$ (150 ml.) and applied to a column of Biorex 70 ($H^+$ form, 1.1 × 40 cm.). The column was washed with the same solvent mixture (750 ml.) and the product eluted with a mixture of equal volumes of methanol and 8% AcOH (500 ml.). After concentration in vacuo to a small volume, the product, ala-val-lys-lys-tyr-leu-asn-ser-ile-leu-asn-$NH_2$ was secured as the acetate salt by lyophilization from acetic acid and water: 118 mg., mp>300°C., $[\alpha]_D^{52}$ − 37° (c 1, 80% AcOH). Amino acid analysis: asp, 2.1; ser, 0.9; ala, 1.0; val, 1.0; ile, 1.0; leu, 1.9; tyr, 1.0; lys, 2.0; $NH_3$, 3.3.

EXAMPLE 9

A. t-Butyloxycarbonyl-$N^\epsilon$-benzyloxycarbonyl-L-lysyl-L-glutaminyl L-methionyl-L-alanyl-L-valyl-$N^\epsilon$-benzyloxycarbonyl-L-lysyl-$N^\epsilon$-benzyloxycarbonyl-L-lysyl-L-tyrosyl-L-leucyl-L-asparaginyl-L-seryl-L-isoleucyl-L-leucyl-L-asparaginamide A solution of t-butyloxycarbonyl-$N^\epsilon$-benzyloxycarbonyl-L-lysyl-L-glutaminyl-L-methionine azide was prepared as follows: the tripeptide hydrazide, prepared as in Example 10 (655 mg.) was suspended in DMF (8 ml.) and the suspension cooled to −30°. HCl in dioxane (1.07 ml., 4.7 M) was added, followed by t-butylnitrite (0.15 ml.). After 30 minutes at −25° to −30°, the mixture was cooled to −60°. Triethylamine (0.7 ml.) was added, followed by the hendecapeptide trifluoroacetate prepared as in Example 1J (1.3 g) in the form of fine powder and also additional base (0.11 ml.). The suspension was allowed to reach 0° slowly and stirring was continued at 4°. After 2 days the same amount of tripeptide azide was added, and after 2 more days one-half of the initial amount of azide was added. After a total of 6 days, the mixture was diluted with ethanol (75 ml.) and the product isolated as described in Example 5. Yield: 1.4 g (81%), mp above 275°. Amino acid analysis: Lys, 3.0; Gln, 1.0; Met, 0.8; ALA, 1.0; Val, 1.0; Tyr, 0.7; Leu, 2.2; Asp, 2.2; Ser, 1.0; Ile, 1.1; $NH_2$, 4.1. For analysis, a sample was dried at 80° and 0.1 mm for 2 hours.

Anal. Calcd for $C_{103}H_{155}N_{21}O_{27}S$ (2151.5): C, 57.5; H, 7.3; N, 13.7; S, 1.5. Calcd for $C_{103}H_{155}N_{21}O_{27}S$ . $3H_2O$ (2205.6): C, 56.1; H, 7.4; N, 13.3; S, 1.5. Found: C, 56.1; H, 7.3; N, 13.3; S, 1.6.

B. L-Lysyl-L-glutaminyl-L-methionyl-L-alanyl-L-valyl-L-lysyl-L-lysyl-L-tyrosyl-L-leucyl-L-asparaginyl-L-seryl-L-isoleucyl-L-leucyl-L-asparaginamde The protected tetradecapeptide (100 ) and L-methionine (150 mg) were dissolved in TFA (3.8 ml) containing anisole (0.2 ml), and HBr gas was bubbled through the solution for 90 minutes. The acids were removed in vacuo and dry ether (100 ml) was added. The precipitate was filtered, washed with ether (50 ml.) and dried in vacuo over NaOH and $P_2O_5$. It was then dissolved in water (5 ml.) and neutralized with triethylam-

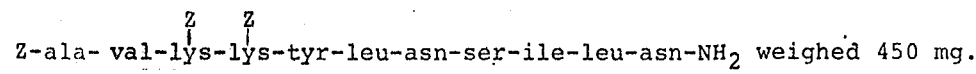

Z-ala-val-lys-lys-tyr-leu-asn-ser-ile-leu-asn-$NH_2$ weighed 450 mg.

For characterization of this intermediate, an aliquot of this material (250 mg.) was suspended in 80% AcOH (50 ml.) and hydrogenated for 7 hours in the presence of a 10 percent palladium-on-charcoal catalyst (75 mg.). After removal of the catalyst and the solvent, the ine. The water was evaporated and the residue was dried in vacuo over $P_2O_5$. It was extracted with chloroform (5 ml.), filtered, washed with chloroform (15 ml.) and dried. The crude peptide was applied in 1% acetic acid (2 ml.) to a Sephadex G-25 column (70 × 2.5 cm.), preequilibrated with 1 percent acetic acid. Fractions of 6 ml were collected, at a flow rate of 30 ml/hr. Monitoring at 280 nm showed that tubes 27–41 contained the desired product. These were pooled and evaporated to give 35 mg. The product moves as a single spot on paper with $R_fB$ 0.35. Amino acid analysis: Lys, 3.0; Gln, 1.0; Met, 0.9; Ala, 1.0; Val, 0.9; Tyr, 1.0; Leu, 2.0; Asp, 2.1; Ser, 0.9; Ile, 1.0.

EXAMPLE 10 t-Butyloxycarbonyl-N -Benzyloxycarbonyl-L-Lysyl-L-Glutaminyl-L-methioninyl Hydrazide The tripeptide methyl ester of Example 2B (2.61 g., 4 mmole) was suspended in methanol (90 ml.). Hydrazine (10 ml.) was added and the stirring continued for 6 hours. The product was filtered, washed with cold methanol (3 × 15 ml.), water (8 × 10 ml.) and dried over $H_2SO_4$ to give 2.33 g. (89 percent) of tBOC-N -Z-lys-gln-met-NHNH$_2$, mp 202°–204°. After recrystallization from methanol, mp 203°–204° $[\alpha]_D^{25}$ −29° (c 1; acetic acid), tlc $R_fA$ 0.70, $R_fB$ 0.76.

Any departure from the above description which conforms to the present invention is intended to be included within the scope of the claims.

What is claimed is:

1. A method for the preparation of Vasoactive Intestinal Peptide of the sequence:

his-ser-asp-ala-val-phe-thr-asp-asn-tyr-thr-arg-leu-arg-lys-gln-met-ala-val-lys-lys-tyr-leu-asn-ser-ile-leu-asn-NH$_2$ which comprises coupling by peptide linkages a peptide of the formula:

$$\text{X-arg-lys}^{X_1}\text{-gln-met-COY}$$

and a peptide of the formula:

$$\text{ala-val-lys}^{X_1}\text{-lys}^{X_1}\text{-tyr-leu-asn-ser-ile-leu-asn-NH}_2,$$

removing the X-amino-protecting group from the resulting peptide, and coupling the latter product with a peptide of the formula:

X-thr-asp-asn-tyr-thr-arg-leu-COY, removing the X-amino-protecting group from the resulting product and coupling the latter product with a peptide of the formula:

X-his-ser-asp-ala-val-phe-COY to produce a peptide of the sequence:

$$\text{X-his-ser-asp-ala-val-phe-thr-asp-asn-tyr-thr-arg-leu-arg-lys}^{X_1}\text{-gln-met-ala-val-lys}^{X_1}\text{-lys}^{X_1}\text{-tyr-leu-asn-ser-ile-leu-asn-NH}_2,$$

and removing the X and $X_1$ protecting groups from the latter peptide; wherein all amino acids are in the L-form, Y is a carboxyl activating group, and wherein X and $X_1$ are groups selected from those of the formula:

(1) $\quad R-O-\overset{O}{\underset{\|}{C}}-$ where R is a straight or branched chained alkyl of 1 to 10 carbon atoms; aryl of 6 to 15 carbon atoms which may be substituted by one or more halogens, nitro, lower alkoxy, or lower alkyl groups; cycloalkyl of 5 to 8 carbon atoms; aralkyl of 7 to 18 carbon atoms which may contain one or more alkyl groups of 1 to about four carbon atoms; alkaryl of 7 to 18 atoms which may contain one or more alkyl groups of 1 to about four carbon atoms; vinyl; isonicotinyl; or adamantyl; (2) phthaloyl; (3) paratoluenesulfonyl; and (4) formyl; and wherein the X amino-protecting group is removable by methods which will not substantially affect the $X_1$ amino-protecting group.

2. A method accordinng to claim 1, wherein Y is an azide, an unsymmetrical anhydride, a symmetrical anhydride, a halide, an active ester, an acyl derivative of hydroxylamine or an acyl imidazole.

3. A method according to claim 2, wherein X is tertiary-butyloxycarbonyl.

4. A method according to claim 3, wherein $X_1$ is benzyloxycarbonyl or substituted benzyloxycarbonyl.

5. A method according to claim 4, wherein Y is $N_3$.

6. A method for the preparation of Vasoactive Intestinal Peptide of the sequence:

his-ser-asp-ala-val-phe-thr-asp-asn-tyr-thr-arg-leu-arg-lys-gln-met-ala-val-lys-lys-tyr-leu-asn-ser-ile-leu-asn-NH$_2$ which comprises coupling by peptide linkages a peptide of the formula:

X-his-ser-asp-ala-val-phe-COY and a peptide of the formula:

$$\text{thr-asp-asn-tyr-thr-arg-leu-arg-lys}^{X_1}\text{-gln-met-ala-val-lys}^{X_1}\text{-lys}^{X}\text{-tyr-leu-asn-ser-ile-leu-asn-NH}_2$$

to produce a peptide of the sequence:

$$\text{X-his-ser-asp-ala-val-phe-thr-asp-asn-tyr-thr-arg-leu-arg-lys}^{X_1}\text{-gln-met-ala-val-lys}^{X_1}\text{-lys}^{X_1}\text{-tyr-leu-asn-ser-ile-leu-asn-NH}_2,$$

and removing the X and $X_1$ protecting groups from the latter peptide, wherein all amino acids are in the L-form, Y is a carboxyl activating group, and wherein X and $X_1$ are groups selected from those of the formula:

(1) $\quad R-O-\overset{O}{\underset{\|}{C}}-$ where R is a straight or branched chain alkyl of 1 to 10 carbon atoms; aryl of 6 to 15 carbon atoms which may be substituted by one or more halogens, nitro, lower alkoxy, or lower alkyl groups; cycloalkyl of 5 to 8 carbon atoms; aralkyl of 7 to 18 carbon atoms which may contain one or more alkyl groups of 1 to about four carbon atoms; alkaryl of 7 to 18 atoms which may contain one or more alkyl groups of 1 to about four carbon atoms; vinyl; isonicotinyl; or adamantyl; (2) phthaloyl, (3) para-toluenesulfonyl; and (4) formyl, and wherein the X amino-protecting group is removable by methods which will not substantially affect the $X_1$ amino-protecting group.

7. A method according to claim 6, wherein X is tertiary-butyloxycarbonyl.

8. A method according to claim 7, wherein $X_1$ is benzyloxycarbonyl.

9. A method according to claim 8, wherein Y is an azide, an unsymmetrical anhydride, a symmetrical anhydride, a halide, an active ester, an acyl derivative of hydroxylamine or an acyl imidazole.

10. A peptide of the sequence:

X-his-ser-asp-ala-val-phe-thr-asp-asn-tyr-thr-arg-leu-

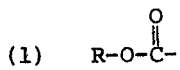

arg-lys-gln-met-ala-val-lys-lys-tyr-leu-asn-ser-ile-leu-asn-NH$_2$, wherein all amino acids are in the L-form, and X and $X_1$ are groups selected from those of the formula:

(1)     R-O-C(=O)- where R is a straight or branched chained alkyl of 1 to 10 carbon atoms; aryl of 6 to 15 carbon atoms which may be substituted by one or more halogens, nitro, lower alkoxy, or lower alkyl groups; cycloalkyl of 5 to 8 carbon atoms; aralkyl of 7 to 18 carbon atoms which may contain one or more alkyl groups of 1 to about four carbon atoms; alkaryl of 7 to 18 carbon atoms which may contain one or more alkyl groups of 1 to about four carbon atoms; vinyl; isonicotinyl; or adamantyl; (2) phthaloyl; (3) para-toluenesulfonyl; and (4) formyl, and wherein the X amino group is removable by methods which will not substantially affect the $X_1$ amino group.

11. A peptide according to claim 10, wherein X is tertiary-butyloxycarbonyl and $X_1$ is benzyloxycarbonyl or substituted benzyloxycarbonyl.

12. A peptide of the sequence: X-his-ser-asp-ala-val-phe and the terminal azide and hydrazide thereof, wherein all amino acids are in the L-form, and X is a protected amino group selected from those of the formula:

(1)     R-O-C(=O)- where R is a straight or branched chained alkyl of 1 to 10 carbon atoms; aryl of 6 to 15 carbon atoms which may be substituted by one or more halogens, nitro, lower alkoxy, or lower alkyl groups; cycloalkyl of 5 to 8 carbon atoms; aralkyl of 7 to 18 carbon atoms which may contain one or more alkyl groups of 1 to about four carbon atoms; alkaryl of 7 to 18 carbon atoms which may contain one or more alkyl groups of 1 to about four carbon atoms; vinyl; isonicotinyl or adamantyl; (2) phthaloyl, (3) para-toluenesulfonyl; and (4) formyl.

13. A peptide according to claim 12, wherein X is tertiary-butyloxycarbonyl.

14. A peptide of the sequence:

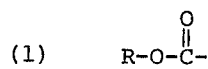

thr-asp-asn-tyr-thr-arg-leu-arg-lys-gln-met-ala-val-lys-lys-tyr-leu-asn-ser-ile-leu-asn-NH$_2$, wherein all amino acids are in the L-form, and $X_1$ is an amino protecting group selected from those of the formula:

(1)     R-O-C(=O)- where R is a straight or branched chained alkyl of 1 to 10 carbon atoms; aryl of 6 to 15 carbon atoms which may be substituted by one or more halogens, nitro, lower alkoxy, or lower alkyl groups; cycloalkyl of 5 to 8 carbon atoms; aralkyl of 7 to 18 carbon atoms which may contain one or more alkyl groups of 1 to about four carbon atoms; alkaryl of 7 to 18 carbon atoms which may contain one or more alkyl groups of 1 to about four carbon atoms; vinyl; isonicotinyl or adamantyl; (2) phthaloyl, (3) para-toluenesulfonyl; and (4) formyl.

15. A peptide according to claim 14, wherein $X_1$ is benzyloxycarbonyl.

16. A peptide of the sequence: X-thr-asp-asn-tyr-thr-arg-leu and the terminal azide and hydrazide thereof, wherein all amino acids are in the L-form, and X is an amino-protecting group selected from those of the formula:

(1)     R-O-C(=O)- where R is a straight or branched chained alkyl of 1 to 10 carbon atoms; aryl of 6 to 15 carbon atoms which may be substituted by one or more halogens, nitro, lower alkoxy, or lower alkyl groups; cycloalkyl of 5 to 8 carbon atoms; aralkyl of 7 to 18 carbon atoms which may contain one or more alkyl groups of 1 to about four carbon atoms; alkaryl of 7 to 18 carbon atoms which may contain one or more alkyl groups of 1 to about four carbon atoms; vinyl; isonicotinyl; or adamantyl; (2) phthaloyl; (3) para-toluenesulfonyl; and (4) formyl.

17. A peptide according to claim 16, wherein X is tertiary-butyloxycarbonyl.

18. A peptide of the sequence:

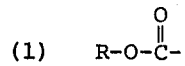

arg-lys-gln-met-ala-val-lys-lys-tyr-leu-asn-ser-ile-leu-asn-NH$_2$, wherein all amino acids are in the L-form, and $X_1$ is selected from those of the formula:

(1) 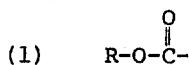

where R is a straight or branched chained alkyl of 1 to 10 carbon atoms; aryl of 6 to 15 carbon atoms which may be substituted by one or more halogens, nitro, lower alkoxy, or lower alkyl groups; cycloalkyl of 5 to 8 carbon atoms; aralkyl of 7 to 18 carbon atoms which may contain one or more alkyl groups of 1 to about four carbon atoms; alkaryl of 7 to 18 carbon atoms which may contain one or more alkyl groups of 1 to about four carbon atoms; vinyl; isonicotinyl; or adamantyl; (2) phthaloyl; (3) para-toluenesulfonyl; and (4) formyl.

19. A peptide according to claim 18, wherein $X_1$ is benzyloxycarbonyl.

20. A peptide of the sequence:

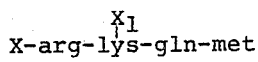
X-arg-lys-gln-met and the terminal hydrazide and azide thereof, wherein all amino acids are in the L-form, and X and $X_1$ are groups selected from those of the formula:

(1) 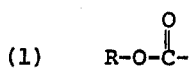

where R is a straight or branched chained alkyl of 1 to 10 carbon atoms; aryl of 6 to 15 carbon atoms which may be substituted by one or more halogens, nitro, lower alkoxy, or lower alkyl groups; cycloalkyl of 5 to 8 carbon atoms; aralkyl of 7 to 18 carbon atoms which may contain one or more alkyl groups of 1 to about four carbon atoms; alkaryl of 7 to 18 carbon atoms which may contain one or more alkyl groups of 1 to about four carbon atoms; vinyl; isonicotinyl; or adamantyl; (2) phthaloyl, (3) para-toluenesulfonyl; and (4) formyl, and wherein the X amino-protecting group is removable by methods which will not substantially affect the $X_1$ amino-protecting group.

21. A peptide according to claim 20, wherein X is tertiary-butyloxycarbonyl and $X_1$ is benzyloxycarbonyl.

22. A peptide of the sequence:

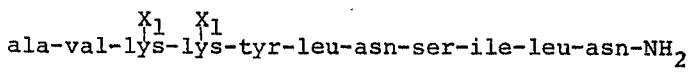
ala-val-lys-lys-tyr-leu-asn-ser-ile-leu-asn-NH$_2$ wherein all amino acids are in the L-form, and $X_1$ is a group selected from those of the formula:

(1) 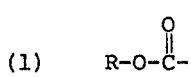

where R is a straight or branched chained alkyl of 1 to 10 carbon atoms; aryl of 6 to 15 carbon atoms which may be substituted by one or more halogens, nitro, lower alkoxy, or lower alkyl groups; cycloalkyl of 5 to 8 carbon atoms; aralkyl of 7 to 18 carbon atoms which may contain one or more alkyl groups of 1 to about four carbon atoms; alkaryl of 7 to 18 carbon atoms which may contain one or more alkyl groups of 1 to about four carbon atoms; vinyl; isonicotinyl; or adamantyl; (2) phthaloyl; (3) para-toluenesulfonyl; and (4) formyl.

23. A peptide according to claim 22 wherein $X_1$ is benzyloxycarbonyl.

24. A peptide of the sequence:

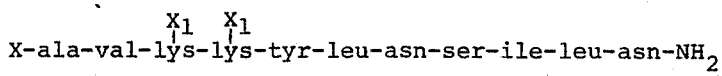
X-ala-val-lys-lys-tyr-leu-asn-ser-ile-leu-asn-NH$_2$ wherein all amino acids are in the L form, and X and $X_1$ are groups selected from those of the formula:

(1) 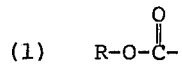

where R is a straight or branched chained alkyl of 1 to 10 carbon atoms; aryl of 6 to 15 carbon atoms which may be substituted by one or more halogens, nitro, lower alkoxy, or lower alkyl groups; cycloalkyl of 5 to 8 carbon atoms; aralkyl of 7 to 18 carbon atoms which may contain one or more alkyl groups of 1 to about four carbon atoms; alkaryl of 7 to 18 carbon atoms which may contain one or more alkyl groups of 1 to about four carbon atoms; vinyl; isonicotinyl; or adamantyl; (2) phthaloyl; (3) paratoluenesulfonyl; and (4) formyl, and wherein the X amino-protecting group is removable by methods which will not substantially affect the $X_1$ amino-protecting group.

25. A peptide according to claim 24, wherein X is tertiary-butyloxycarbonyl and $X_1$ is benzyloxycarbonyl.

26. A peptide of the sequence:
L-his-L-ser-L-asp-L-ala-L-val-L-phe.

27. A peptide of the sequence:
L-ala-L-val-L-lys-L-lys-L-tyr-L-leu-L-asn-L-ser-L-ile-L-leu-L-asn-NH$_2$.

28. The pharmaceutically acceptable salts of the peptide of claim 27.

29. A peptide of the sequence:
L-lys-L-gln-L-met-L-ala-L-val-L-lys-L-lys-L-tyr-L-leu-L-asn-L-ser-L-ile-L-asn-NH$_2$.

30. A peptide of the sequence:
L-arg-L-lys-L-gln-L-met-L-ala-L-val-L-lys-L-lys-L-tyr-L-ley-L-asn-L-ser-L-ile-L-leu-L-asn-NH$_2$.

31. The pharmaceutically acceptable salts of the peptide of claim 30.

32. A peptide of the sequence:
L-thr-L-asp-L-asn-L-tyr-L-thr-L-arg-L-leu-L-arg-L-lys-L-gln-L-met-L-ala-L-val-L-lys-L-lys-L-tyr-L-leu-L-asn-L-ser-L-ile-L-leu-L-asn-NH$_2$.

* * * * *